(12) United States Patent
Ichikawa et al.

(10) Patent No.: US 6,826,367 B2
(45) Date of Patent: Nov. 30, 2004

(54) CAMERA EXTERIOR PART AND CAMERA WITH LENS BARRIER

(75) Inventors: Tetsumi Ichikawa, Hachioji (JP);
Setsuya Kataoka, Hachioji (JP); Naoki Matsumoto, Hachioji (JP); Tatsuo Takanashi, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 10/408,594

(22) Filed: Apr. 7, 2003

(65) Prior Publication Data

US 2004/0067054 A1 Apr. 8, 2004

(30) Foreign Application Priority Data

| Apr. 9, 2002 | (JP) | ..................................... 2002-106888 |
| Apr. 9, 2002 | (JP) | ..................................... 2002-106900 |
| Apr. 22, 2002 | (JP) | ..................................... 2002-119307 |
| Jun. 10, 2002 | (JP) | ..................................... 2002-169004 |

(51) Int. Cl.$^7$ ............................................. G03B 17/02
(52) U.S. Cl. ............................ 396/535; 29/418; 29/428
(58) Field of Search ........................... 396/535; 29/592, 29/897, 418, 428

(56) References Cited

U.S. PATENT DOCUMENTS

| 4,152,065 A | * | 5/1979 | Kobori ........................ 396/535 |
| 4,693,769 A | * | 9/1987 | Fritz et al. .................. 156/73.1 |
| 5,159,753 A | * | 11/1992 | Torrence .................. 29/895.22 |
| 5,708,897 A | * | 1/1998 | Manabe et al. ............. 396/535 |

FOREIGN PATENT DOCUMENTS

JP          06294991          10/1994

* cited by examiner

Primary Examiner—David M. Gray
(74) Attorney, Agent, or Firm—Volpe and Koenig, P.C.

(57) ABSTRACT

In a camara exterior part according to the present invention, a front mold member having in one piece a reinforcing portion for preventing deformation is formed using a resin by injection molding. The front mold member is fixed to the inner surface of a front cover made of a metal by adhesion. After the fixing, the reinforcing portion is cut and removed from the front mold member. According to the present invention, high-accurate assembly can be easily realized with a simple arrangement.

15 Claims, 25 Drawing Sheets

CAMERA EXTERIOR PART AND CAMERA WITH LENS BARRIER

This application claims benefit of Japanese Application No. 2002-106888 filed in Japan on Apr. 9, 2002, No. 2002-119307 filed in Japan on Apr. 22, 2002, No. 2002-106900 filed in Japan on Apr. 9, 2002, and No. 2002-169004 filed in Japan on Jun. 10, 2002, the contents of which are incorporated by this reference.

BACKGROUND OF THE INVENTION

1. Field of the Invention

The present invention relates to a camera exterior part comprising an exterior member made of a metal and an inner frame member made of a resin, the inner frame member being arranged on the inner surface of the exterior member, a manufacturing method thereof; and a camera having an exterior member made of a conductive material such as a metal, and more particularly to a camera in which electric noises can be supplied to a ground pattern of an electric circuit, the noises coming from the outside through the internal mechanism of the camera; and a camera with a lens barrier which is movably arranged on the front surface of a camera body case and functions as a cover of a photographic lens.

2. Related Art Statement

Recently, some camera exterior parts each constituting a camera are constructed in such a manner that an exterior member of a camera body, for example, a front cover is made of a metal to add a high quality impression to the camera.

The camera exterior part having the above exterior member made of a metal is manufactured as follows: A front mold member, which serves as an inner frame member and is made of a resin, is attached to the inner surface of a front cover of the camera exterior part by adhesion, and a device arranged in the camera or a rear cover of the exterior member is attached to the front mold member. The front cover is formed using a press work technique. The front mold member is formed using a resin by an injection molding technique.

Recent some cameras are constructed in such a manner that a camera body is covered with an exterior member made of a metal in order to give the impression that the camera has a good appearance and a high grade impression on the users. In the case of using a metal as the exterior member, in order to prevent a short circuit between the exterior member and circuit parts or a circuit pattern arranged on a flexible board of the camera body, a part or the whole of the inner surface of the exterior member is subjected to an insulating process or an insulating sheet is adhered to the inner surface thereof.

For the above-mentioned cameras, since the exterior member has conductivity, the camera is charged (or discharged) due to static electricity. In addition, the exterior member functions as an antenna, so that the camera is apt to pick up noises from surroundings. In some cases, the noises cause a current, resulting in adverse effects on electric parts in the camera. Therefore, the exterior member is electrically connected to a ground pattern of an electric circuit of the camera so that the potential of the exterior member is reduced to a ground potential. If the camera picks up noises, a generated current flows through the ground pattern. Thus, the electric parts can be protected.

As a grounding method, for example, one end of a piece of elastic metal is fixed by a screw or the like to a camera body together with a lead wire. The lead wire is connected to the ground pattern of the electric circuit of the camera by soldering. When the exterior member is attached to the camera body, the other end of the metal piece is come into contact with the exposed inner metal surface of the exterior member while being pressed against the surface, thus resulting in electrical connection.

According to another method, a part of the inner metal surface of the exterior member is exposed and processed such that the exposed portion is partially superimposed on the ground pattern of a printed board of the camera body when the exterior member is attached to the camera body. Upon attachment, the superimposed portion and pattern are tightly fixed using screws, thus grounding the exterior member.

Further, Japanese Unexamined Patent Application Publication No. 11-15054 discloses a technique of realizing electrical connection between an exterior member and a contact on the negative electrode of a battery through a fixing member.

In conventional general cameras, a photographic lens, a finder, and various measurement windows are arranged on the front surface of each camera body. A lens barrier is freely slidably disposed on the front surface of a camera body case. The lens barrier covers the photographic lens, the finder, and the various measurement windows to protect them. Upon photographing, the lens barrier is slid, thus exposing the photographing lens, the finder, and the measurement windows.

As a camera with a lens barrier as mentioned above, for example, as shown in FIGS. 37 and 38, a lens barrier 1 molded using a resin is generally used. In the lens barrier 1 made of resin, almost semicylindrical guide nails 1a are formed in two portions on each of the surfaces of each of the both ends of the lens barrier 1. The guide nails 1a protrude on both the surfaces of each end at a predetermined distance from each other. The guide nails 1a are freely movably attached to a pair of guide rails 2a provided for a front mold member 2, which is made of a resin and constitutes a camera body case. Thus, the lens barrier 1 can be stably guided without being influenced by parallelism between the guide rails 2a and the ends of the lens barrier 1.

Recent some cameras include a metallic exterior serving as the exterior of a camera body case in order to present a high quality impression. For the cameras using such a metal plate, when a battier-attached camera is formed, it is desired that the lens barrier 1, freely slidably arranged on the front surface of the camera body case, is also formed using a metal plate.

For conventional barrier-attached cameras, Japanese Unexamined Patent Application Publication No. 1-255839 discloses a camera having the following structure: When a lens barrel is projected, a barrier for protecting a lens is locked through a retaining lever at an open position at the front of a lens in order to prevent the interference between the lens barrel and the barrier. In this camera, the distal end portion of the retaining lever can be in contact with a part of a movable frame of the lens barrel when the lens barrel is projected (projected mode) or while the lens barrel is being projected.

Japanese Unexamined Patent Application Publication No. 6-294991 discloses a barrier-attached camera. In this barrier-attached camera, a barrier includes a locking mechanism for protecting a lens barrel. The locking mechanism includes a locking member, a contact member, a gear transmission member, and the like. In this camera, in a state in which the lens barrel is located at a projected position where it is possible to photograph, when the barrier is moved in the closing direction, the distal end of the contact member slightly comes into contact with the lens barrel and the locking member comes into contact with a protrusion on a camera body. The locking member is in contact with the camera body, thus protecting the lens barrel against the operating force applied to the barrier.

SUMMARY OF THE INVENTION

It is an object of the present invention to provide a camera exterior part which simply and easily realizes high-accurate assembly with a simple arrangement.

Another object of the present invention is to provide a camera in which a conductive exterior member can be surely grounded with a simple arrangement.

Further another object of the present invention is to provide a camera with a lens barrier which simply and easily realizes high-quality manufacture without edge working.

Still another object of the present invention is to provide a camera with a lens barrier for opening and closing the front surface of a lens barrel, the camera having a simple structure in which the operation of the lens barrier does not affect the projecting or retracting operation of the lens barrel.

According to one aspect of the present invention, there is provided a method for manufacturing a camera exterior part having an exterior member made of a metal and an inner frame member made of a resin, the inner frame member being integrally attached to the inner surface of the exterior member, the method including the steps of: forming the inner frame member using a resin by injection molding so as to have in one piece a reinforcing portion for preventing deformation; applying an adhesive to the inner surface of the metallic exterior member to fix the inner frame member having the reinforcing portion in one piece to the inner surface of the exterior member; and cutting and removing the reinforcing portion of the inner frame member after the completion of the fixing with the adhesive.

Further, according to another aspect of the present invention, there is provided a camera exterior part including: an inner frame member which is formed so as to have a reinforcing portion for preventing deformation in one piece and which is formed using a resin by injection molding; and fixing means for applying an adhesive to the inner surface of the exterior member made of a metal, pushing the inner frame member having in one piece the reinforcing portion against the inner surface of the exterior member to integrally fix the inner frame member to the exterior member, wherein after the completion of the fixing by the fixing means, the reinforcing portion of the inner frame member is cut.

Further, according to another aspect of the present invention, there is provided a camera exterior part including an exterior member made of a metal; and an inner frame member which is attached to the inner surface of the exterior member by adhesion, which has in one piece a reinforcing portion for preventing deformation, and which is formed using a resin by injection molding, the reinforcing portion being removed after the completion of the attachment.

Further, according to another aspect of the present invention, there is provided a camera having a lens barrier which is movably disposed at the front of a camera body case made of a metal and which can be moved to a closed position, where the front surface of a photographic lens is covered, and to an open position, where the front surface of the photographic lens is exposed, the camera including; the lens barrier formed by working a metal plate; guide rails which are arranged in the camera body case and are in contact with the lens barrier to slidably guide the lens barrier; and protrusions formed on the surface of the lens barrier in the vicinity of the worked end faces of the lens barrier perpendicular to the surface thereof, the protrusions being in contact with the surfaces of the respective guide rails to slide the lens barrier.

Further, according to another aspect of the present invention, there is provided a camera including; a lens barrier which is movable to a closed position, where the front surface of the photographic lens is covered, and to an open position, where the front surface of the photographic lens is exposed, the lens barrier being formed by working a metal plate and having protrusions on the surface thereof in the vicinity of the worked end faces, the protrusions protruding perpendicular to the surface of the lens barrier; and guide rails to which the protrusions of the lens barrier are slidably fitted in order to slidably guide the lens barrier to the closed position, where the photographic lens is covered, and to the open position, where the front surface of the photographic lens is exposed.

Further, according to another aspect of the present invention, there is provided a camera including: a printed wiring board including a pattern portion having a ground potential; a conductive spring in which at least one end serves as an end turn; and a conductive member having conductivity at least on the surface which the other end of the spring is pressed against, wherein the spring holds an exposed portion of the pattern portion at the end turn and presses the other end thereof against the conductive member to realize electrical connection, thus reducing the potential of the conductive member to the ground potential.

Further, according to another aspect of the present invention, there is provided a camera including a printed wiring board having a pattern portion in which a ground pattern is exposed; a conductive spring in which at least one end is tightly wound; an exterior member made of a metal; and a contact portion which is provided for the exterior member and is come into contact with the other end of the spring, wherein the spring holds the pattern portion with the tightly-wound end and the electrical connection between the printed wiring board and the exterior member is realized through the spring.

Further according to another aspect of the present invention, there is provided a camera including: a photographic lens barrel having a lens movement path between a photographable position and a non-photographable position where it is impossible to photograph; a barrier having a barrier movement path between a closed position, where the barrier covers the photographic lens barrel, and an open position, where the barrier is withdrawn from the front surface of the photographic lens barrel, the barrier movement path intersecting the lens movement path; and a locking member which is provided for a camera body, which is engaged with the barrier to inhibit the movement of the barrier when the barrier is moved from the open position to the closed position in a state in which the photographic lens barrel is located in the barrier movement path of the barrier, and which continues the engagement so that an operating force applied to the barrier in the closing direction does not affect the movement of the photographic lens barrel when the operating force is continuously applied to the barrier even in a state in which the photographic lens barrel is deviated from the barrier movement path of the barrier.

Other features and advantages of the present invention will be apparent from the following description.

DESCRIPTION OF THE PREFERRED EMBODIMENT

Embodiments of the present invention will now be described in detail hereinbelow with reference to the drawings.

Figure 1:
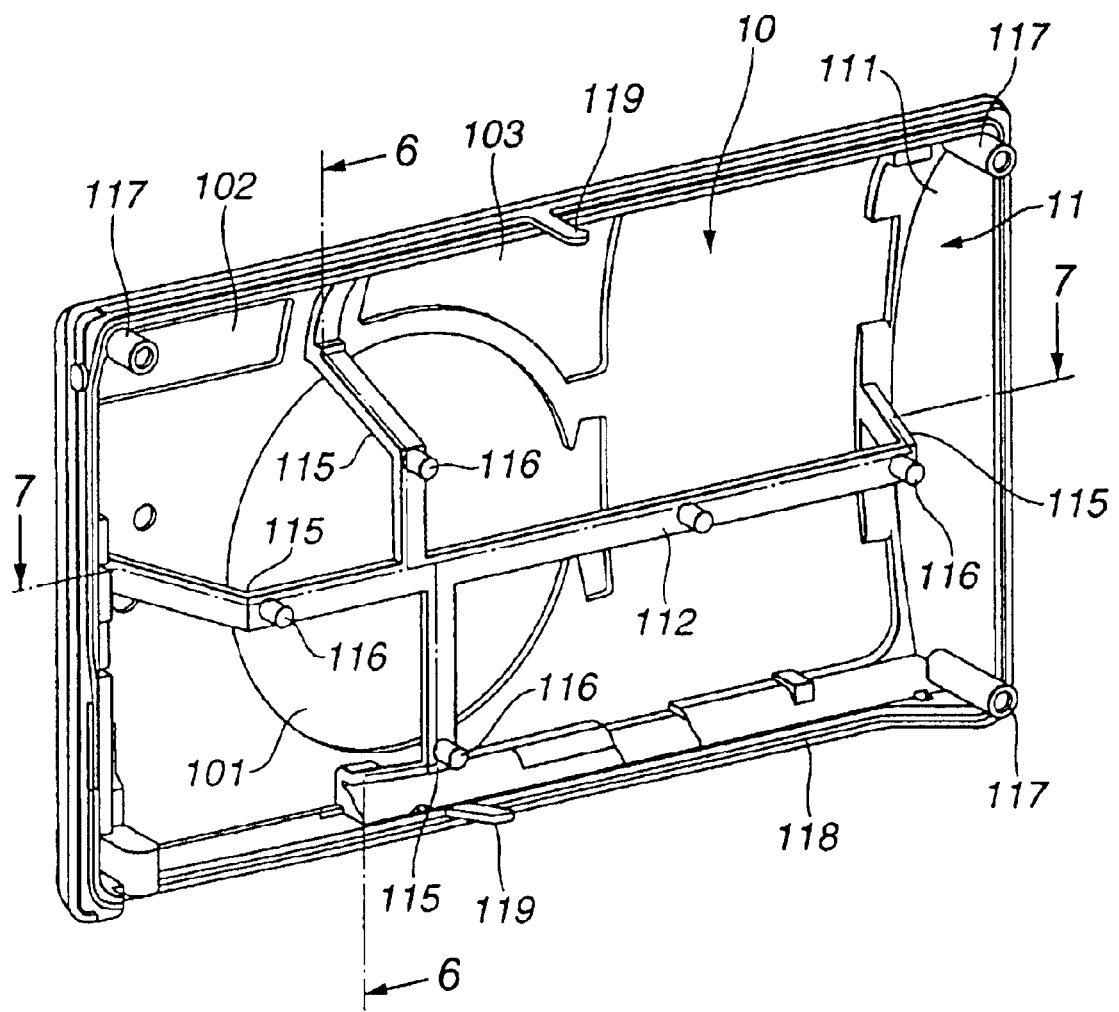
FIG. 1 is a perspective view of a camera exterior part according to a first embodiment of the present invention, the view showing the completion of fixing of the camera exterior part during manufacture.
Figure 2:
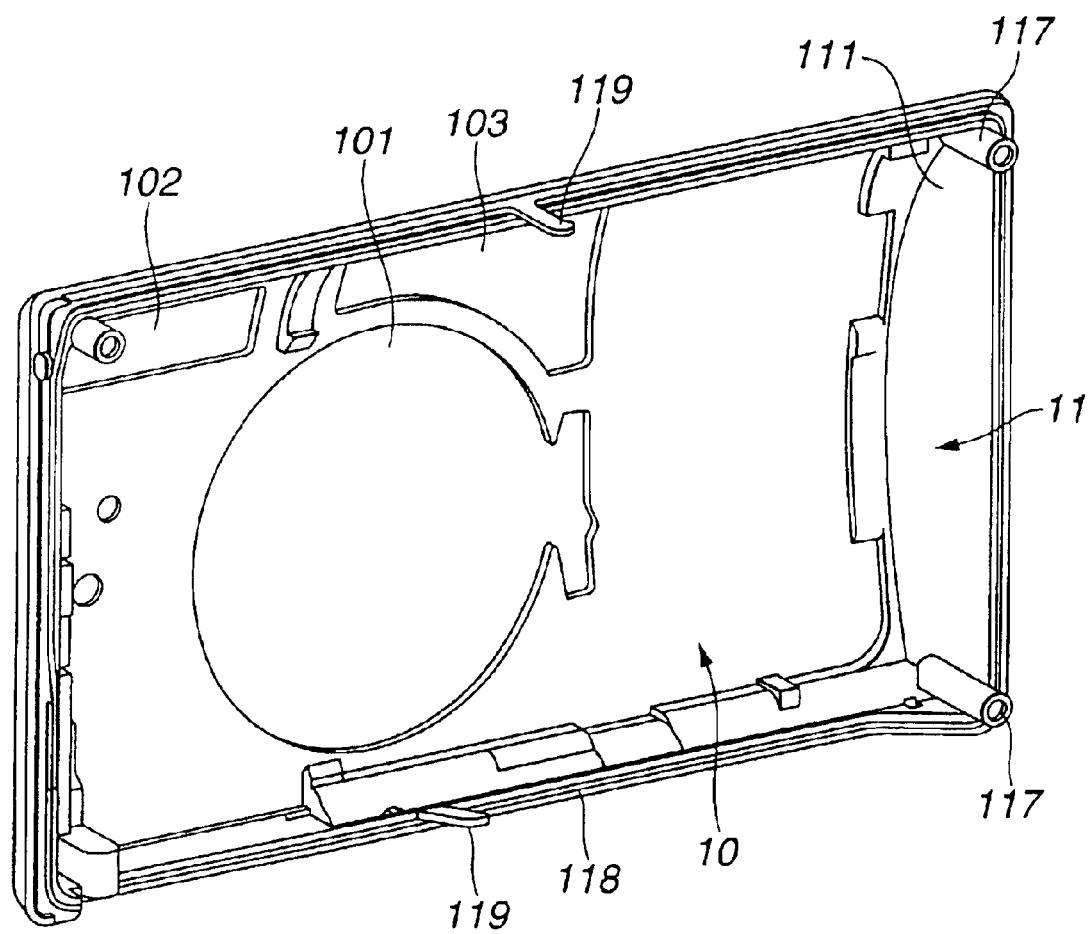
FIG. 2 is a perspective view showing the completion of the manufacture of the camera exterior part shown in FIG. 1.

FIGS. 1 and 2 show a camera exterior part according to a first embodiment of the present invention. FIG. 1 shows a state during fixing and FIG. 2 shows a state in which manufacture is completed.

Figure 3:
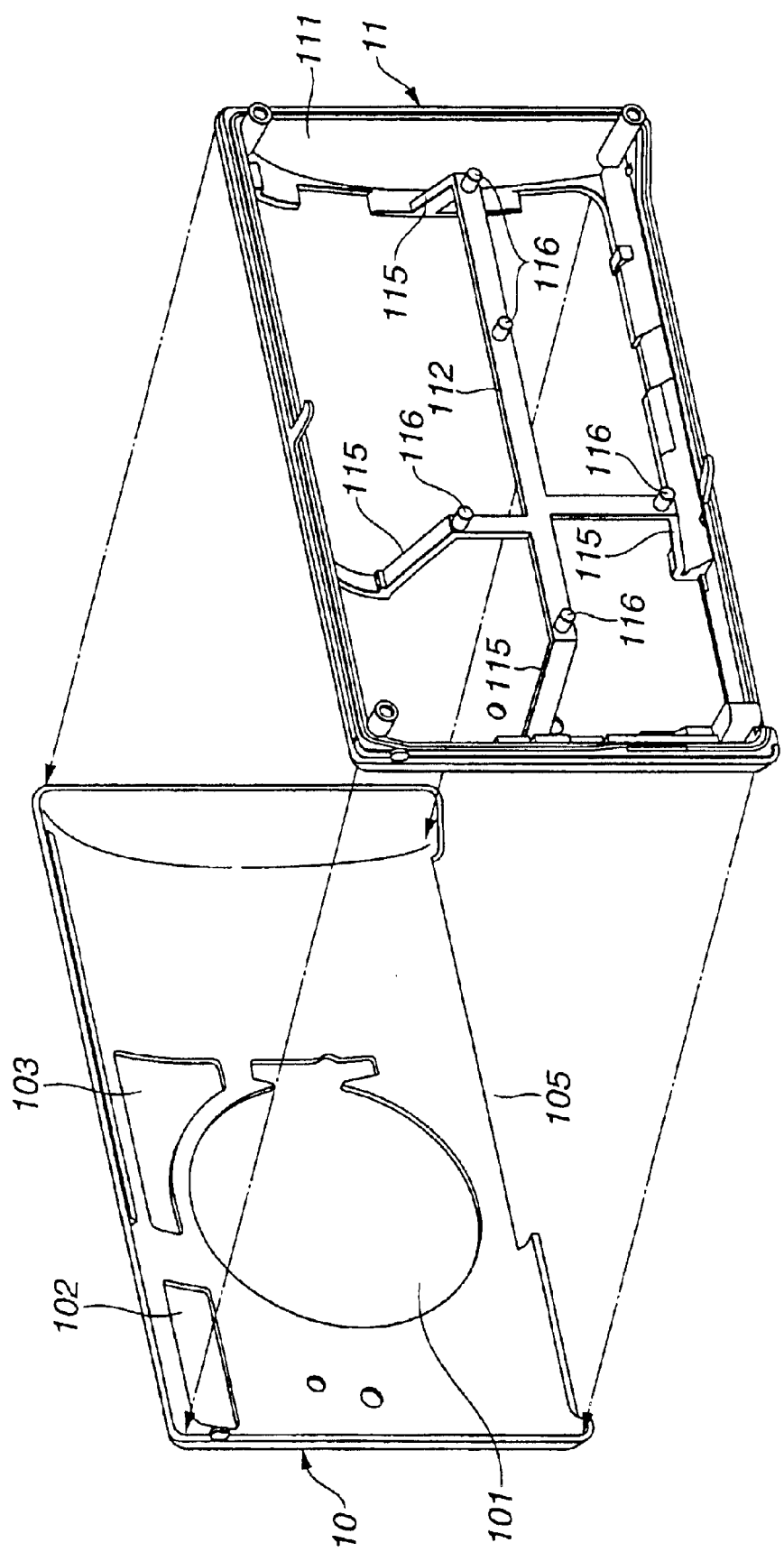
FIG. 3 is an exploded perspective view showing a front cover and a front mold constituting the camera exterior part of FIG. 1, as observed from the rear.
Figure 4:
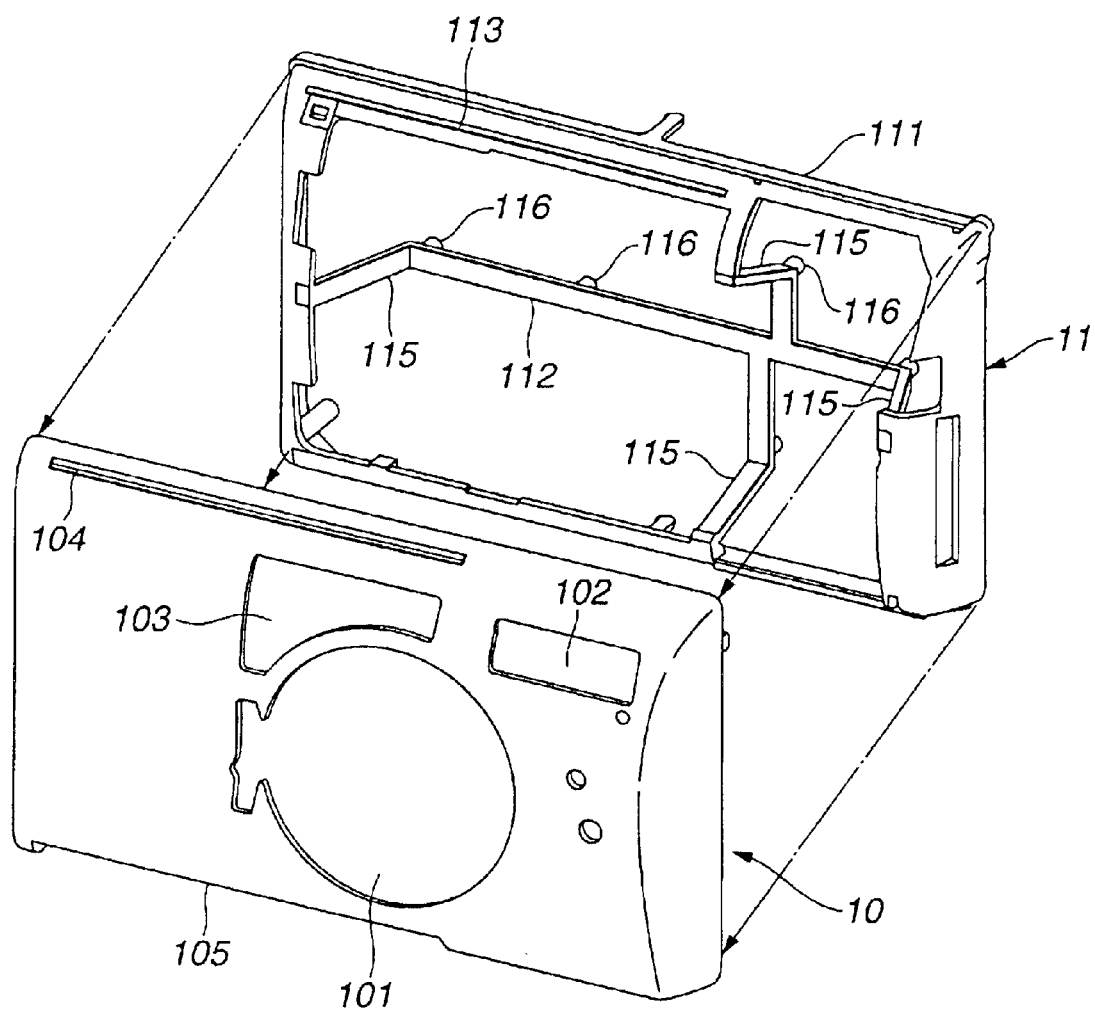
FIG. 4 is an exploded perspective view showing the front mold and the front mold of the camera exterior part in FIG. 1, as viewed from the front.

In other words, a front cover 10 serves as an exterior member. The front cover 10 has a lens-frame-unit accommodation hole 101, through which a lens frame unit (not shown) is inserted, a flash accommodation hole 102, an AF-finder-unit accommodation hole 103, and the like on the front surface thereof. The front cover 10 is made of a metal such as aluminum, stainless steel, magnesium, or titanium and is formed by, for example, a press work technique. As shown in FIGS. 3 and 4, a pair of guide holes 104 and 105 for barrier attachment is formed at the upper and lower ends of the front cover 10.

A front mold 11 serving as an inner frame member made of a resin such as polycarbonate or an ABS resin is attached to the inside of the front cover 10. The front mold 11 is formed using the resin by a well-known injection molding technique. Members constituting respective camera functioning units (not shown) are attached to predetermined portions of the front mold 11.

The front mold 11 integrally has a frame member 111 which is, for example, substantially rectangular in shape and a band-like reinforcing member 112 which is installed substantially cross-shapedly between the side of the frame member 111 and the opposite side thereof. The front surface of the frame member 111 is shaped into a predetermined form corresponding to the inner surface of the front cover 10. A pair of barrier guides 113 and 114 is formed on the upper and lower ends of the frame member 111 so as to correspond to the pair of guide holes 104 and 105 of the front cover 10.

The reinforcing member 112 has folded portions 115, folded backward, in the vicinity of, for example, the respective ends of the reinforcing member 112 in order to prevent the inner frame member from warping or deforming, thus holding the flatness to the initial state. The reinforcing member 112 is formed as a runner for supplying a resin in the formation of, for example, the front mold 11 using a resin by the above-mentioned injection molding technique. Resin supply ports are used as band retaining protrusions 116 constituting fixing means for attachment and fixing.

The front mold 11 integrally has a fitting groove 118 and a plurality of elastic retaining portions 119 on the rear thereof. Accordingly, in the front mold 11, a fitting portion of a rear cover (not shown) is fitted into the fitting groove 118 and the elastic retaining portions 119 are fitted into a retained portion of the rear cover (not shown) with its elasticity. Further, the front mold 11 is attached to the rear cover (not shown) using attachment screws 117 integrated with the front mold 11. The rear cover (not shown), the front cover 10, and the front mold 11 constitute an exterior assembly covering the above camera body (not shown).

A method for manufacturing the camera exterior part which is composed of the front cover 10 and the front mold 11 as mentioned above will now be described.

First, for example, a press work technique is used in a cover manufacturing step. A plate-shaped metal is press worked into a desired shape, thus forming the front cover 10. In a mold manufacturing step, the front mold 11 is formed using a resin by the injection molding technique so as to have in a piece the frame member 111, the reinforcing member 112, the barrier guides 113 and 114, the attachment screws 117, the fitting groove 118, and the elastic retaining portions 119. The reinforcing member 112 prevents the front mold 11 formed using the resin from warping or deforming after the formation, thus retaining the flatness of the formation.

Figure 5:
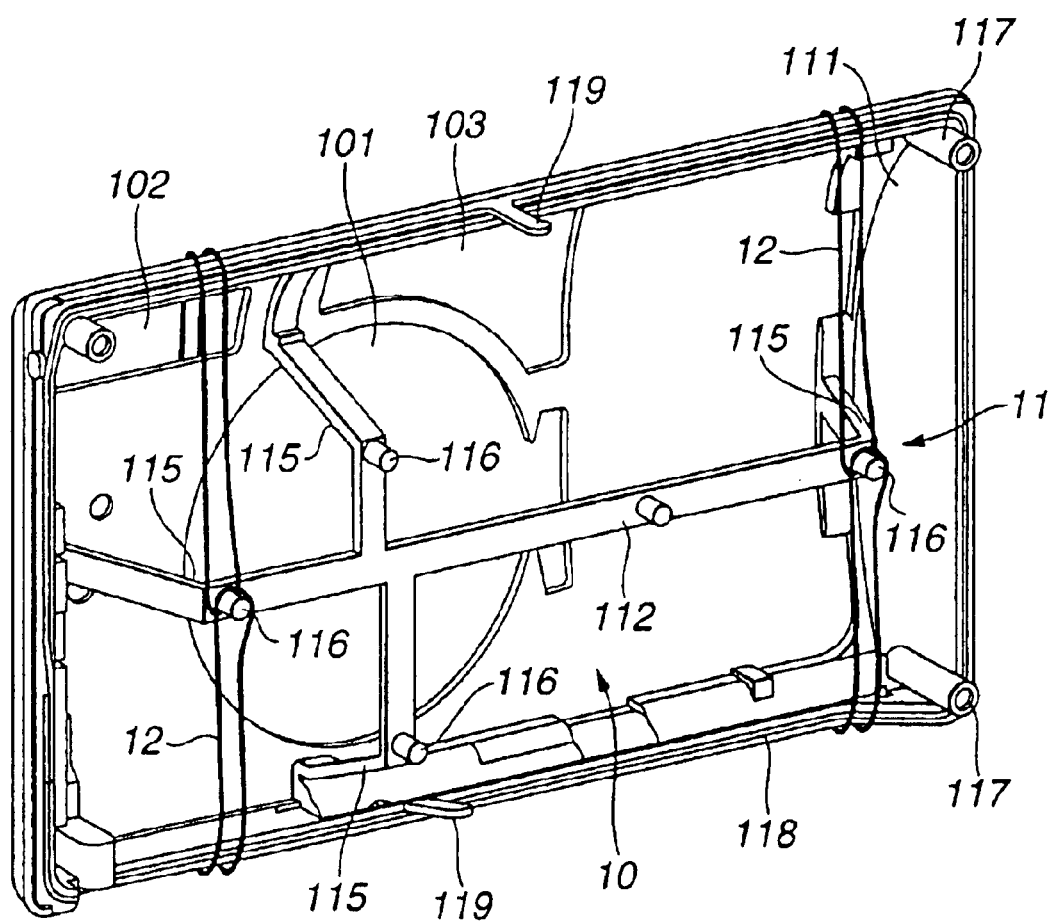
FIG. 5 is a perspective view showing a step of fixing the camera exterior part of FIG. 1.

Subsequently, in a fixing step, an adhesive is applied to the inner surface of the front cover 10. Then, the outer surface of the front mold 11 is come into contact with the inner surface of the front cover 10. Thus, the front mold 11 is attached to the inside of the front cover 10. In this state, band members 12 are wound around the front cover 10 and the front mold 11 as shown in, for example, FIG. 5. The ends of the band members 12 are retained by the respective band retaining protrusions 116 of the reinforcing member 112 of the front mold 11. In this instance, the front cover 10 and the front mold 11 are left as they are connected with pressure by the band members 12 until the adhesive cures. Upon curing of the adhesive, the reinforcing member 112 prevents the front mold 11 from warping or deforming to maintain the initial flatness.

Then, the adhesive cures to fix the front mold 11 to the front cover 10. In this state, the band members 12 are first detached from the band retaining protrusions 116 of the reinforcing member 112. As shown in FIG. 1, the front mold 11 integrated with the reinforcing member 112 is fixed to the inner surface of the front cover 10 by adhesion.

Figure 6:
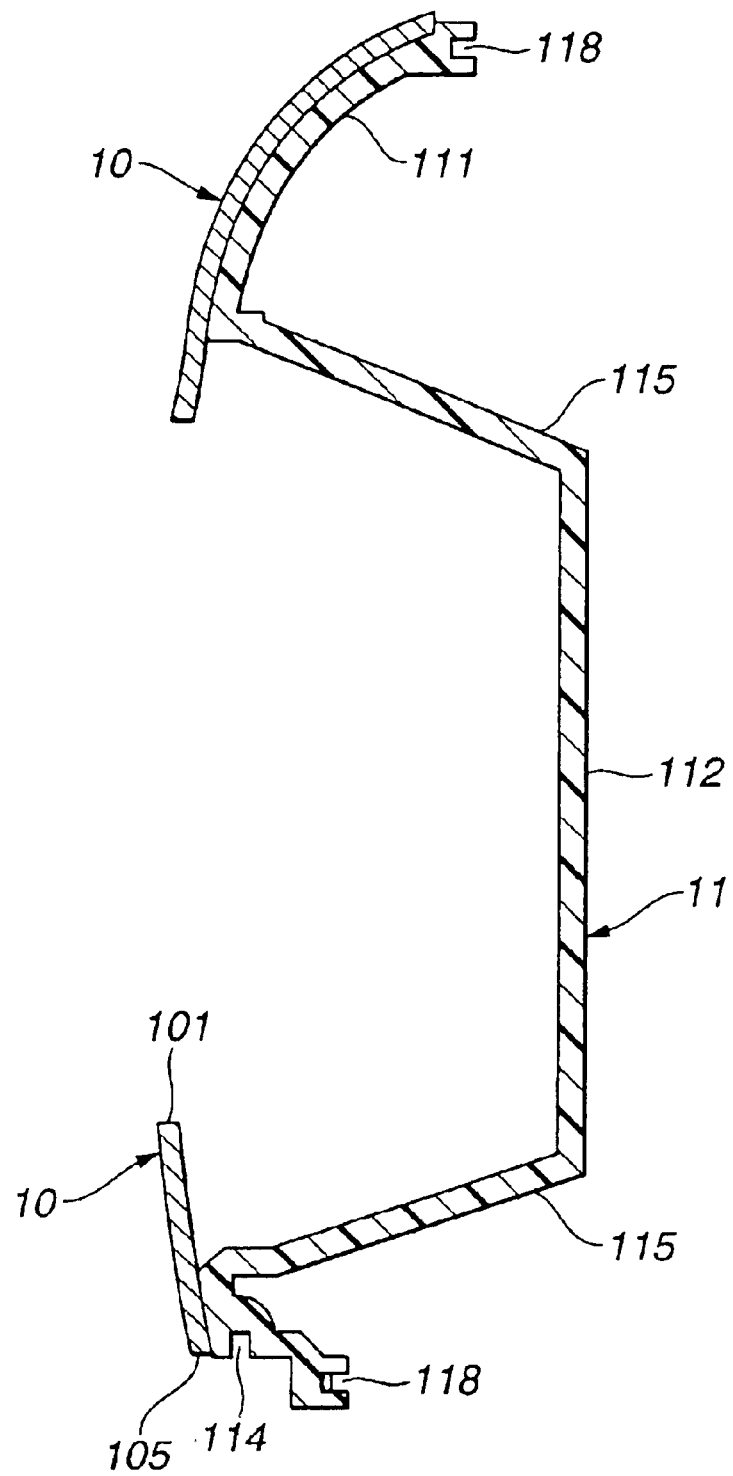
FIG. 6 is a sectional view at the line I—I of FIG. 1.
Figure 7:
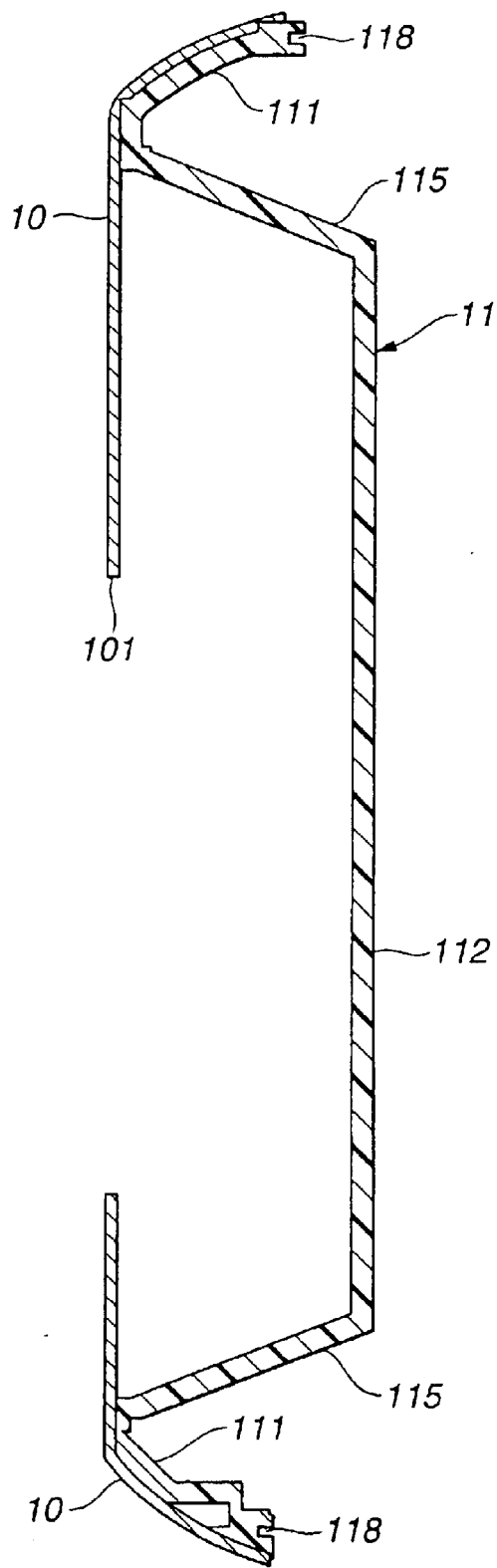
FIG. 7 is a sectional view at the line II—II of FIG. 1.

As shown in FIGS. 6 and 7, the reinforcing member 112 protrude backward in the front mold 11. For instance, in a step of attaching the front mold 11 to the camera body (not shown), the reinforcing member 112 is cut using a cutting tool such as a nipper and is then removed from the front mold 11 as shown in FIG. 2.

After that, the camera body (not shown) and the rear cover (not shown) are attached to the rear of the part composed of the front cover 10 and the front mold 11. A barrier (not shown) is disposed at the front surface of the front cover 10 so that both the ends of the barrier are freely slidably fitted to the barrier guides 113 and 114 of the front mold 11 through the guide holes 104 and 105, respectively. The barrier (not shown) is guided through the guide rails 113 and 114 of the front mold 11 and is moved between a closed position, where the barrier covers the foregoing lens frame unit (not shown) inserted through the lens-frame-unit accommodation hole 101 on the front surface of the front cover 10, and a photographing position where the lens frame unit (not shown) is exposed so that it is possible to photograph.

As mentioned above, the camera exterior part is constructed in such a manner that the front mold 11 integrated with the reinforcing member 112 for preventing the deformation is injection-molded using a resin, the front mold 11 is fixed to the inner surface of the front cover 10 made of a metal by adhesion, and after the fixing, the reinforcing member 112 is cut and removed from the front mold 11.

According to this, with the front mold 11 being restrained from warping or deforming by the reinforcing member 112, the front mold 11 is adhered to the front cover 10. Thus, stable fixing is realized with high accuracy. After the fixing, the reinforcing member 112 is cut and removed. Therefore, a strong arrangement for fixing and reinforcement is realized without restricting the structure of the exterior part. Consequently, high-quality assembly of the front mold 11 and the front cover 10 is realized, resulting in the simple and easy assembly of the exterior part with high accuracy.

According to the method for manufacturing the camera exterior part, the front mold 12 integrated with the reinforcing member 112 for preventing the deformation is injection-molded using a resin, the front mold 11 is fixed to the inner surface of the front cover 10 made of a metal by adhesion, and after the fixing, the reinforcing member 112 is cut and removed from the front mold 11.

According to this, the reinforcing member 112 restrains the front mold 11 from warping or deforming. In the fixing step, with the desired flatness being retained until the adhesive cures, the front mold 11 is adhered to the front cover 10, thus realizing stable fixing with high accuracy. Since the reinforcing member 112 is cut and removed after the fixing, the strong arrangement for fixing and reinforcement can be realized without restricting the structure of the exterior part. Consequently, high-quality assembly of the front mold 11 and the front cover 10 is realized, resulting in the simple and easy assembly of the exterior part with high accuracy.

The above-mentioned embodiment has been described with a case where the reinforcing member 112 is realized using the runner upon injection molding. The structure is not limited to this. In addition to this, the frame member 111 may also be integrated with the reinforcing member 112 which is another thing from the runner.

Figure 8:
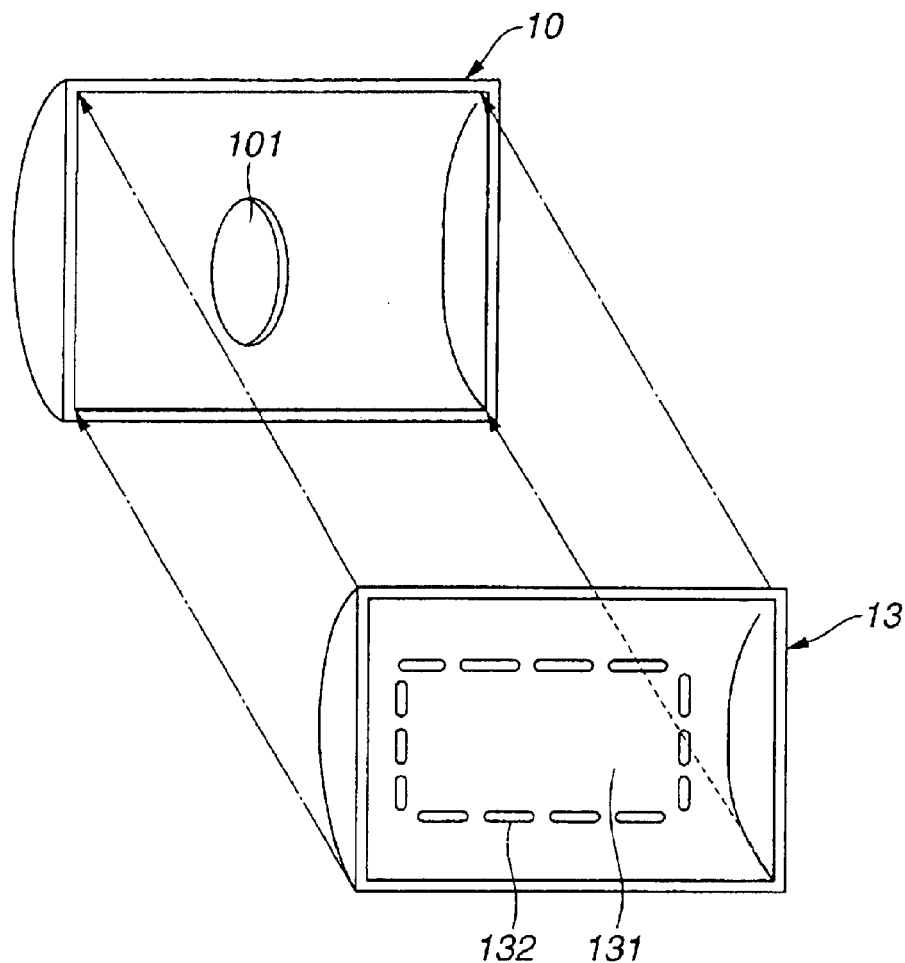
FIG. 8 is an exploded perspective view of a modification of the camera exterior part according to the first embodiment shown in FIG. 1.
Figure 9:
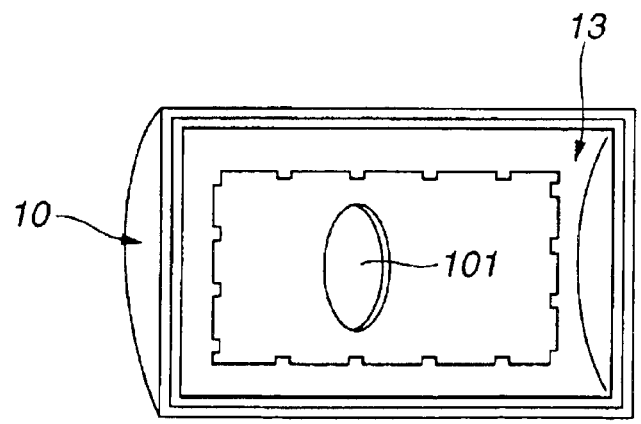
FIG. 9 is a perspective view of the completely manufactured camera exterior part of FIG. 8.

The present invention is not limited to the above embodiment. According to a modification of the first embodiment, a front mold 13 can be formed in a shape as shown in FIGS. 8 and 9 using a resin. In FIGS. 8 and 9, the same components as those in FIGS. 1 to 7 are designated by the same reference numerals to omit the detailed description.

According to the modification in FIGS. 8 and 9, the front mold 13 has a reinforcing member 131 in one piece so as to close the front surface of the metallic front cover 10. The front mold 13 will be attached and fixed to the substantially curved front surface of the front cover 10. A plurality of holes 132 such as perforations are punched at regular intervals around the reinforcing member 131 of the front mold 13.

The reinforcing member 131 is formed so as to close the lens-frame-unit accommodation hole 101 of the front cover 10 in a state in which the front mold 13 is attached to the inside of the front cover 10.

In the above arrangement, the front mold 13 is formed so as to have in one piece the reinforcing member 131 to be cut and the perforations 132 using a resin by the well-known injection molding technique are contiguously integrated. Since the front mold 13 formed using the resin is integrated with the reinforcing member 131, the operation of the reinforcing member restrains the front mold 13 from warping or deforming to retain desired flatness.

In a fixing step, an adhesive is first applied to the periphery (corresponding to a portion excluding the reinforcing member 131 of the front mold 13) of the inner surface of the front cover 10 and the outer surface of the front mold 13 is come into contact with the inner surface of the front cover 10. Thus, the front mold 13 is attached to the front cover 10.

In this state, the foregoing band members 12 (refer to FIG. 5 because they are not shown in FIGS. 8 and 9 in views of circumstances of the drawings) are wound around the front cover 10 and the front mold 13 and are left until the adhesive cures. Upon curing of the adhesive, the reinforcing member 131 prevents the front mold 13 from warping or deforming, thus retaining the initial flatness.

After that, in this state in which the adhesive cures to fix the front cover 10 to the front mold 13, the band members 12 are first detached and removed. In this instance, a shock is given in the direction from the front surface to backward of the reinforcing member 131 through the lens-frame-unit accommodation hole 101 of the front cover 10. Thus, the reinforcing member 131 is cut along the perforations 132 and is removed from the front surface of the front mold 13. Accordingly, the lens-frame-unit accommodation hole 101 of the front cover 10 is exposed at the rear of the front mold 13, thus preparing for the attachment to the camera body (not shown) as mentioned above.

The above-mentioned modification in FIGS. 8 and 9 has been described with a case where the front mold 13 is formed with the reinforcing member 131 surrounded by the perforations 132 formed at regular intervals and the reinforcing member 131 is cut and removed along the perforations 132. The arrangement is not limited to this case. Instead of the perforations, reinforcing ribs are arranged at predetermined intervals around the reinforcing member. The reinforcing member can also be cut and removed from the front mold so as to be punched using the reinforcing ribs.

Further, the above-mentioned embodiment and modification have been described with the case where the exterior part is applied to the front cover. The present invention is not limited to this case. The exterior part can also be applied to the rear cover. Similar advantages are expected.

The foregoing embodiment and modification have been described with the case where the front cover 10 is formed by press work working is not limited to this case. The front cover may be formed using various working techniques such as injection molding and the like.

Accordingly, the present invention is not limited to the above-mentioned embodiment and modification. In addition, other various modifications are possible without departing from the spirit of the invention in embodying stages. Further, since the foregoing embodiment and modification include various stages of the invention, various inventions may be obtained by the appropriate combinations of disclosed components.

For example, if some components are eliminated from all the components disclosed in the embodiment and the modification, the arrangement excluding the eliminated components may be included in the present invention so long as the disadvantages, described in the paragraph regarding the problems that the present invention is to solve, can be overcome and advantages, which will be described in a paragraph regarding advantages of the invention, are obtained.

As described above in detail, according to the first embodiment and the modification thereof, the camera exterior part which can simply and easily realize high-accurate assembly with a simple construction and the method for manufacturing the same can be provided.

Figure 10:
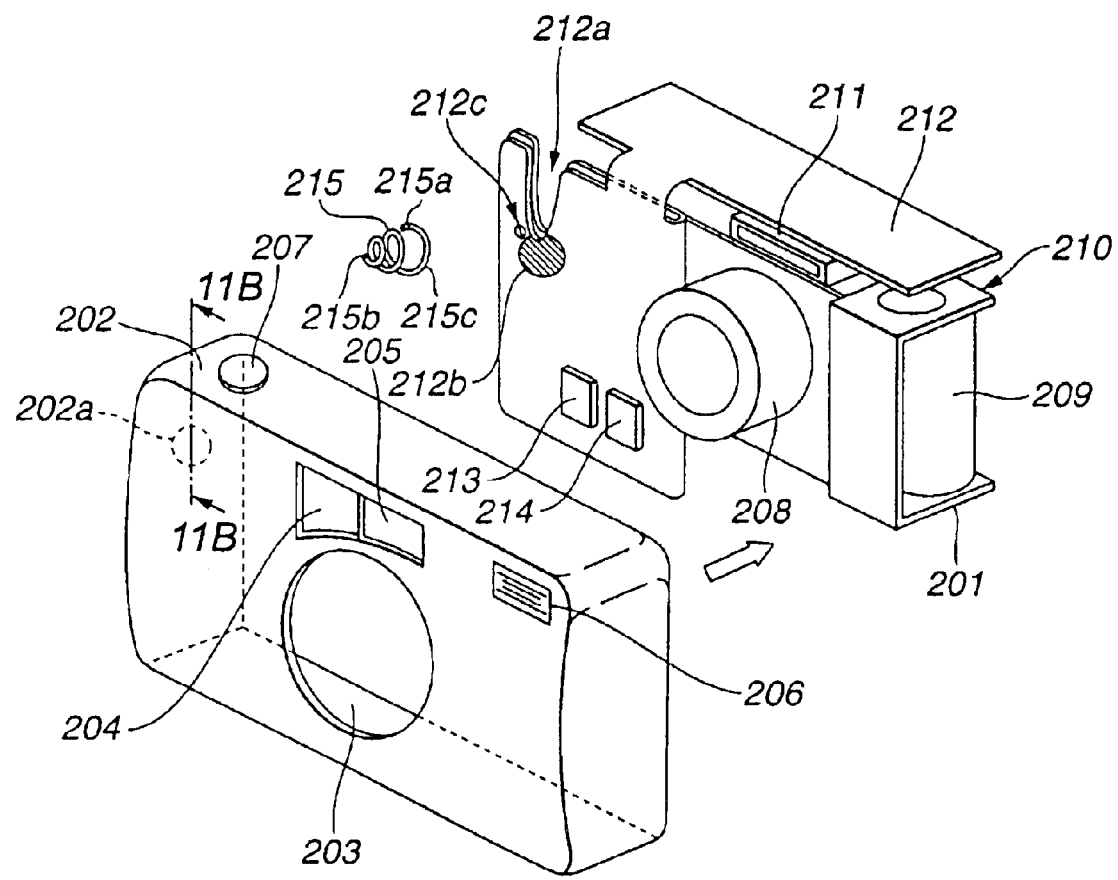
FIG. 10 is a view showing an example of the structure of a camera according to a second embodiment of the present invention.

FIG. 10 shows an example of the structure of a camera according to a second embodiment of the present invention.

This camera is constructed in such a manner that the front of a camera body 201 is covered with an exterior member 202.

The whole of the exterior member 202 is made of a conductive material such as metal. Aluminum is anodized or an insulating sheet is adhered to the inner surface of the exterior member 202 in order to prevent a short circuit in circuit parts or a circuit pattern mounted on a flexible board (printed wiring board) of the camera body. Thus, the inner surface of the exterior member 202 exhibits insulating properties. According to the present embodiment, the exterior member 202 is shaped into a box covering the front surface (the side of the photographic lens), the upper and lower surfaces, and both the side surfaces of a camera, except for the rear surface (the side of a rear cover). A photographic-lens opening 203 through which a lens barrel is inserted, a finder window 204, a distance-measuring and photometric window 205, and a flash window 206 are formed in the exterior member 202. A release button 207 is arranged on the upper surface of the exterior member 202. It is a matter of course that the exterior member 202 is not limited to the box type. Other windows may be formed as necessary.

In the camera body 201, the following are arranged: a lens barrel 208 at the center of the front surface thereof, spool chamber 210 including a spool shaft 209 for taking up a film on the right as viewed from the front of the camera, and cartridge chamber (not shown) for loading a film cartridge on the left as viewed in the same manner. A finder and distance-measuring and photometric unit 211 are disposed in the upper portion of the camera body. A main flexible board 212 is disposed above the unit 211 so as to cover the left of the front surface of the camera body. The main flexible board 212 includes an electric circuit for controlling various components of the camera and performing the arithmetic operation. The front surface of the main flexible board 212 is doubly folded up. A main control unit (CPU) 213 for performing controls and computations and an interface IC (IFIC) 214 for transmitting and receiving signals to from the respective components are arranged in the doubly folded-up portion of the board 212. A V-shaped notch 212a through which a ground spring is attached is formed at the upper end of the front surface of the main flexible board 212. The notch 212a includes a ground portion in which a ground spring 215 is inserted.

Figure 11A:
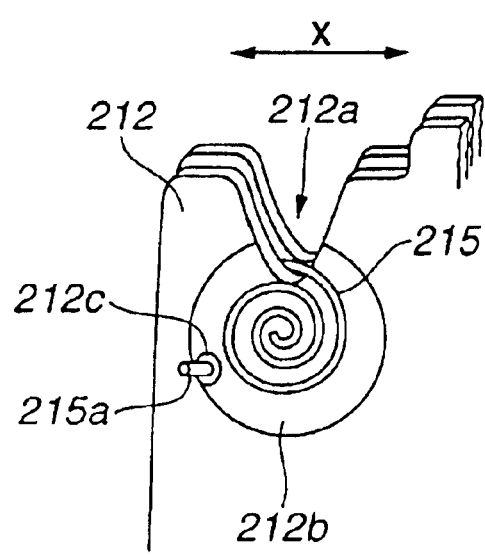
FIG. 11A is a perspective view showing the structure of a ground portion for grounding an exterior member of the camera of FIG. 10.
Figure 11B:
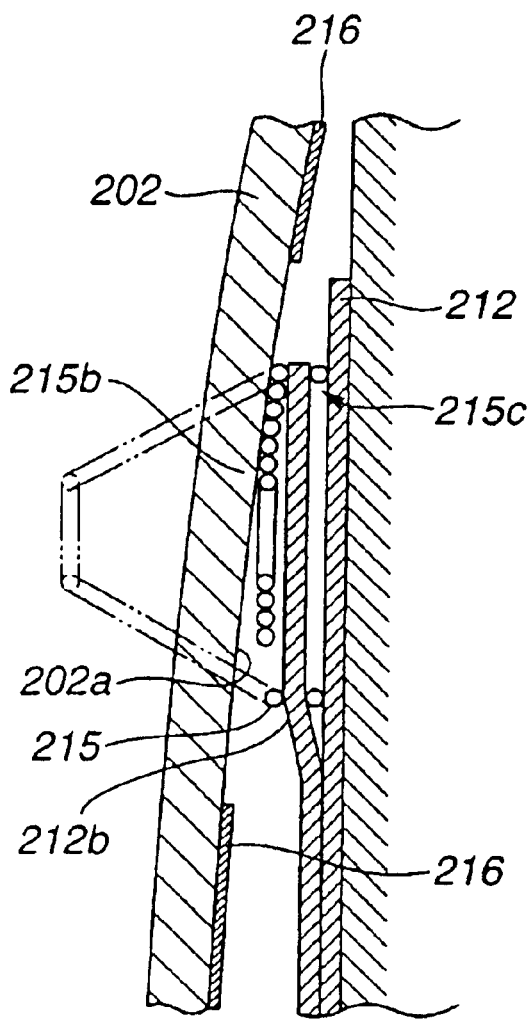
FIG. 11B is a sectional view at the line III—III of FIG. 10, the view showing a state where the ground portion in FIG. 11A is attached to the camera.

FIG. 11A is a perspective view of the structure of the ground portion for grounding the exterior member. FIG. 11B is a sectional view at the line III—III of FIG. 10 and shows the state of the ground portion attached to the camera.

The V-shaped notch 212a is formed at the upper end of the front surface of the main flexible board 212. The notch 212a functions to restrict the movement of the spring 215 in the direction X shown in FIG. 11A. The side portions of the notch restrict the movement of the spring 215. Accordingly, the shape is not limited to the shape of a letter V. A U-shaped notch, a semicircular notch, or a rectangular notch can be used. The shape of the notch is appropriately set depending on the depth of cut and the designing conditions of the camera. In other words, although the spring 215 has to be positioned within a range where the spring 215 is in contact with a ground pattern 212b, it is unnecessary to accurately position the spring 215. Accordingly, in consideration of the size of the ground pattern 212b, the shape of the notch can be appropriately changed such that even when the spring 215 moves, the spring 215 can maintain contact with the ground pattern 212b.

The circular ground pattern 212b is formed on the main flexible board 212 so as to overlap partially the lower portion of the notch 212a. A positioning hole 212c is formed on the ground pattern 212b or in the vicinity thereof. An insulation coating on the surface of the ground pattern 212b is eliminated and the surface of the ground pattern 212b is exposed.

As shown in FIG. 11B, the ground spring 215 is, for example, a conical coil spring that is conical in shape. The spring 215 is wound so that when the spring 215 is compressed, respective winding segments do not overlap with each other. One end 215a of an end turn 215c on the bottom of the conical spring is folded and inserted into the positioning hole 212c of the notch 212a formed on the main flexible board 212. When the spring 215 is inserted to the notch 212a, the end 215a is inserted into the positioning hole 212c, thus positioning the spring 215. The end turn 215c elastically holds the ground pattern 212b which is on the main flexible board 212, thus accomplishing the electrical connection between the spring 215 and the ground pattern 212b. In this instance, if the end 215a is merely inserted into the positioning hole 212c, the spring 215 may rotate around the end 215a. However, since the above-mentioned notch 212arestricts the movement of the spring 215 in the direction X, the spring 215 is not deviated from the ground pattern 212b.

The end turn 215c is formed by tightly winding. Accordingly, only the insertion of the end turn 215c of the spring 215 allows the end turn 215c to elastically hold the ground pattern 212b, resulting in simple assembly. On the other hand, in the exterior member 202, an insulating sheet 216 is eliminated in a position opposite to the spring 215. A conductive portion 202a serving as the metallic surface of the exterior member 202 is exposed.

Therefore, when the exterior member 202 is attached to the camera body 201, the spring 215 is compressed as shown in FIG. 11B. An upper portion 215b of the spring 215 comes into contact with the conductive portion 202a on the inner surface of the exterior member 202 with pressure of the spring 215, resulting in the electrical connection between the exterior member 202 and the ground pattern in the main flexible board 212. In the conducting state, the potential of the exterior member 202 is decreased to the potential of the ground pattern, namely, the ground potential.

As mentioned above, according to the present embodiment, the camera exterior member made of a conductive material is attached to the camera body, resulting in the electrical connection between the exterior member and the ground pattern of the printed wiring board of the camera body through the conductive coil spring. Consequently, a current caused by noises surrounding the camera or charges caused by static electricity can be supplied from the exterior member to the ground pattern of the electric circuit, thus preventing adverse effects on electric parts of the camera.

A third embodiment of the present invention will now be described.

Figure 12:
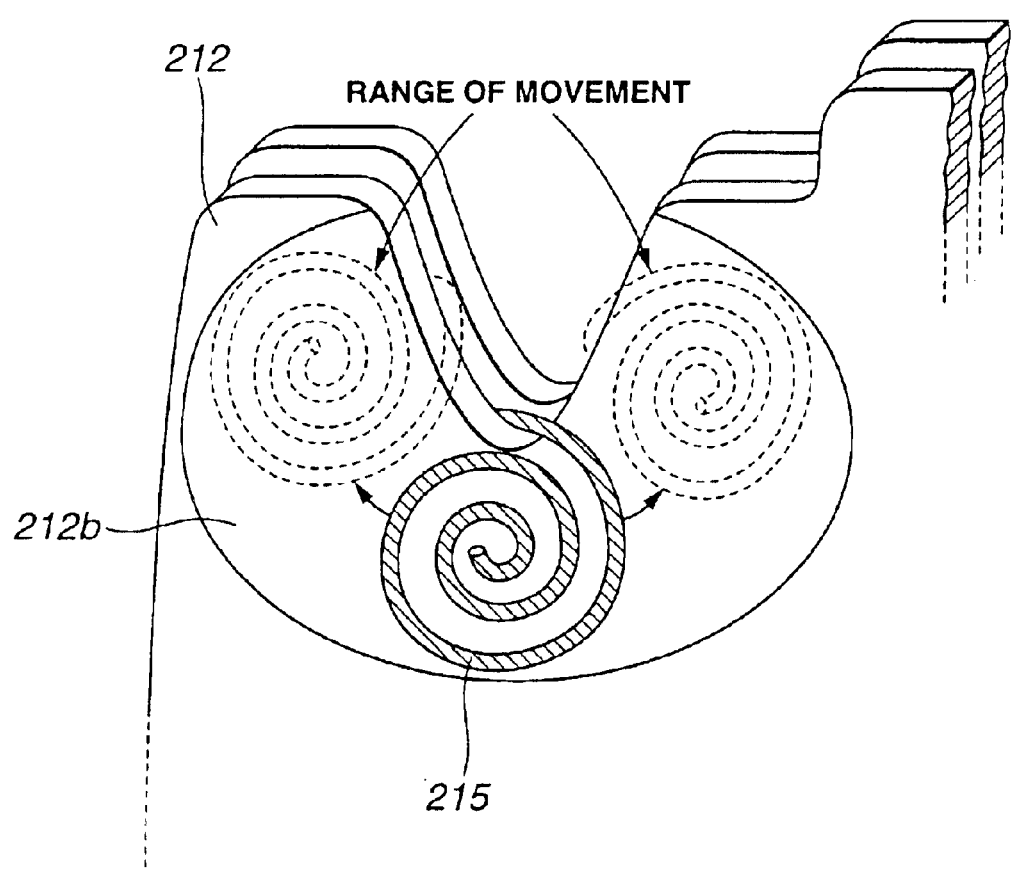
FIG. 12 is a view showing an example of the structure of a ground portion of a camera according to a third embodiment of the present invention.

FIG. 12 shows an example of the structure of a ground portion according to the third embodiment. According to the third embodiment, the ground portion differs from that of the foregoing second embodiment. Since the other components are the same as those of the second embodiment, the description regarding the components is omitted.

According to the foregoing second embodiment, the positioning hole 212c is formed on the ground pattern 212b or in the vicinity thereof in the main flexible board 212. According to the present embodiment, in order to increase the area of the ground pattern 112b, the ground pattern 212b is formed such that the lower portion (bottom) of the notch 212a substantially serves as the center of the pattern. Except that the end 215a of the spring 215 is not folded, the same spring 215 as that of the second embodiment is used. The spring 215 is arranged in the fold of the main flexible board 212 and the end turn 215c is inserted to the lower portion of the notch 212a.

According to the third embodiment, the ground pattern 212b is formed in a range where the position of the spring 215 is restricted due to the notch 212a formed in the main flexible board 212. Accordingly, it is unnecessary to arrange the end turn 215c by folding the spring 215. Thus, the shape of the part can be simplified and the assembly is easily accomplished.

The foregoing second and third embodiments have been described with the case where the whole of the exterior member is made of an electric conductor such as metal. The exterior member is not limited to this case. An exterior part having the following structure can also be used: A metal plate is drawn to form a metallic cover serving as a part or the whole of the exterior of a camera and a cover made of a resin by molding is then integrally fixed to the inner surface of the cover. Protrusions and attachment portions such as tapped holes for attaching various operating members of the camera body are formed on the inner surface of the resin cover. When the exterior part is attached to the camera body, a portion of the resin cover which is in contact with the upper portion 215b of the coil spring 215 is eliminated, thus exposing the metal surface.

Further, according to the present embodiment, the conical spring is used for the electrical connection between the exterior member and the ground pattern. In addition to this, a cylindrical coil spring (including tight winding) or a thin plate spring can also be used so long as the spring is formed so as to elastically hold the ground pattern by a tightly wound portion thereof. Means for electrical connection is not limited to the spring. For example, a metal clip having such a shape that one end thereof is folded can also be used.

According to the above-mentioned second and third embodiments, the ground portion is arranged on the front surface of the camera. The position is not limited to this case. The ground portion can also be arranged on the main flexible board on the upper surface of the camera. When the ground portion is arranged, an operation switch provided for the exterior member can be used. In addition, the ground portion can also be arranged in the vicinity of an operation switch provided for the camera body or an opening for the lens barrel. For instance, if a release button (release switch) provided for the upper surface of the exterior member is cylindrical, a cylindrical coil spring is fitted to the periphery of the release button. On the main flexible board, a ground pattern is formed in a portion in the vicinity of the arrangement of the release button so that the pattern is in contact with the end of the cylindrical coil spring when the exterior member is attached to the camera body. Thus, the similar advantages as those of the above embodiments can be derived.

According to the foregoing second and third embodiments, the notch and the positioning hole are formed to restrict the position of the spring 215. In order to eliminate these components to simplify the shape of the part, an adhesive tape can be used to fix the spring. Alternatively, the force of the spring can be increased, thus preventing the movement of the spring.

As described above in detail, the second and third embodiments of the present invention can provide a camera in which a predetermined conductive exterior member can surely be grounded with a simple arrangement without increasing the number of components.

Figure 13:
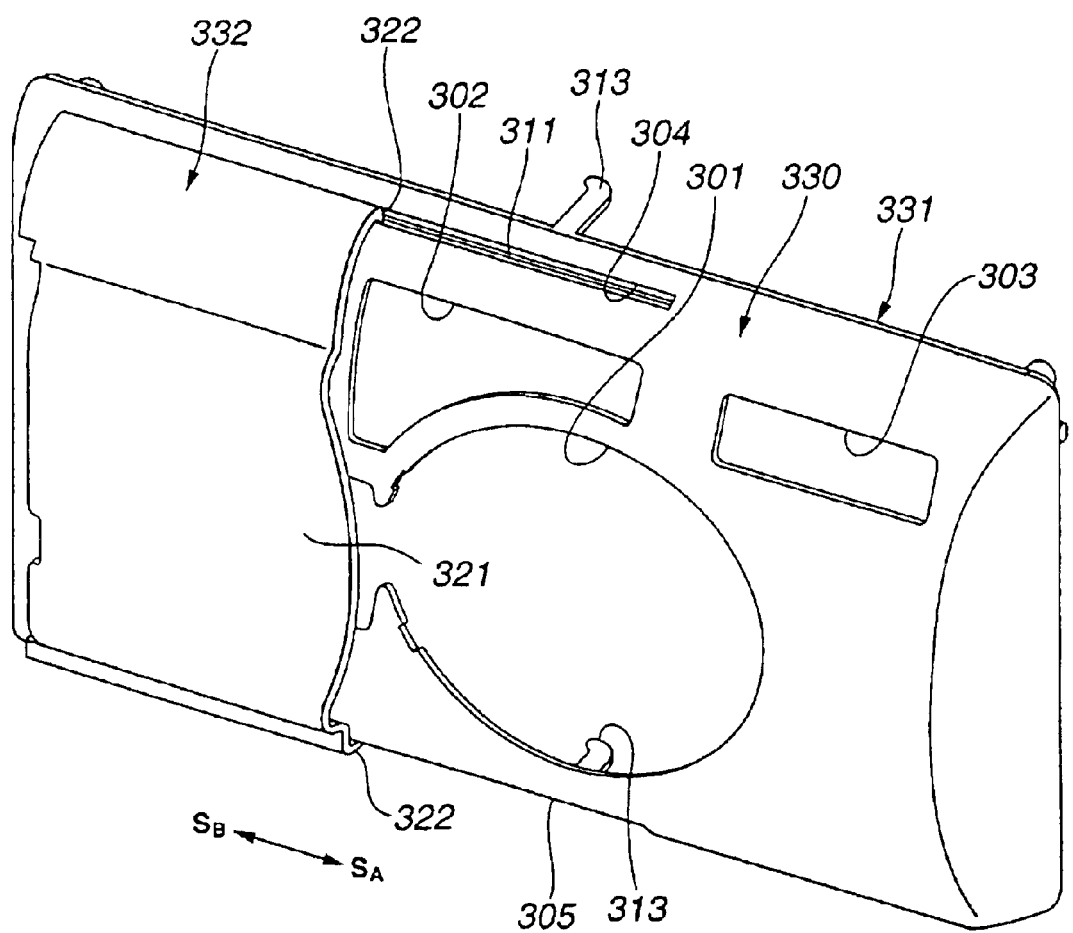
FIG. 13 is a perspective view showing the front surface of a camera with a lens barrier according to a fourth embodiment of the present invention.

FIG. 13 shows an essential part of a camera with a lens barrier according to a fourth embodiment of the present invention. In the camera with the lens barrier, a front cover 330 on the front surface of the camera constitutes a camera body case. The front cover 330 is formed using a metal plate made of aluminum, stainless steel, magnesium, or titanium and is formed by, for example, the press work technique. A front mold member (hereinbelow, referred to as a front mold) 331, which is a frame made of a resin, is adhered and attached to a predetermined position of the inner surface of the front cover 330.

A lens-frame-unit accommodation hole 301 through which a photographic lens is arranged is formed at the center of the front surface of the front cover 330. An AF-finder-unit accommodation hole 302 and a flash-unit accommodation hole 303 are formed side by side above the lens-frame-unit accommodation hole 301. Further, a through hole 304 and a notch 305, which function as a pair of guide rails, are formed so as to have a predetermined length in the directions shown by arrows SA and SB (the directions of movement) at the upper portion and the lower edge of the front surface of the front cover 330.

On the other hand, a pair of rails 311 (the lower rail is not shown in views of circumstances of the drawing) are separately formed in substantially parallel to each other on the upper and lower portions of the front surface of the front mold 331. When the front mold 331 is attached to the inner surface of the front cover 330, these rails 311 are accommodated and arranged in the through hole 304 and the notch 305 of the front cover 330.

Elastic retaining nails 313 and fitting recesses 314 (refer to FIG. 14·2) are formed on the rear of the front mold 331. Each fitting recess 314 is fitted to the corresponding fitting protrusion of a rear cover (not shown) which covers the rear of the camera and serves as the camera body case. The elastic engaging nails 313 are elastically engaged with respective predetermined portions of the rear cover (not shown). Accordingly, the front mold 331 is attached to the rear cover (not shown) while holding the camera body (not shown) therein, the front mold 331 being detachable therefrom.

A lens barrier 332 is freely slidably arranged at the front surface of the front cover 330 in the directions shown by the arrows SA and SB so as to cover the lens-frame-unit accommodation hole 301. The lens barrier 332 is formed using a metal plate made of aluminum, stainless steel, magnesium, or titanium by, for example, the press work technique.

A closing portion 321 is formed at substantially the center of the lens barrier 332 so as to close the lens-frame-unit accommodation hole 301 and the AF-finder-unit accommodation hole 302 of the front cover 330. A pair of folded sliding portions 322 is formed on the upper and lower edges of the closing portion 321 so that the portions 322 can be received in the pair of rails 311 of the front mold 331.

Figure 14:
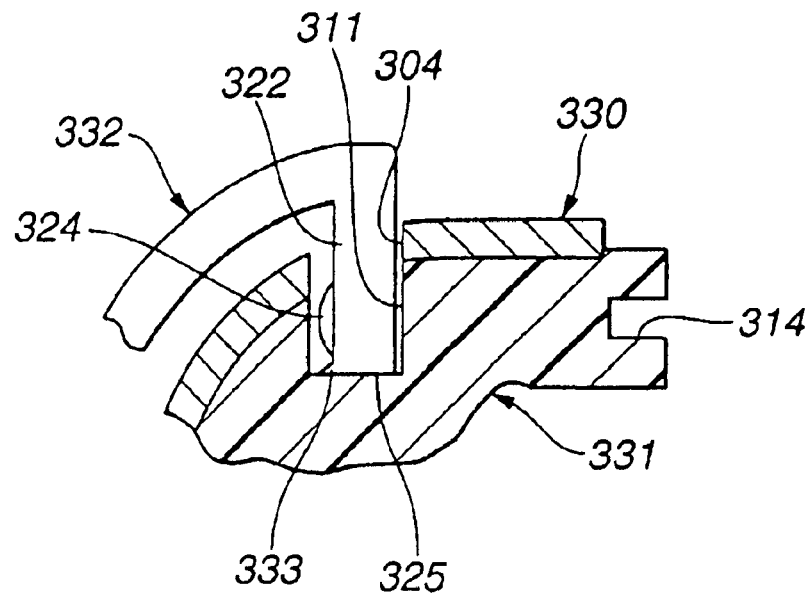
FIG. 14 is a sectional view of an essential part of the camera with the lens barrier shown in FIG. 13.
Figure 15:
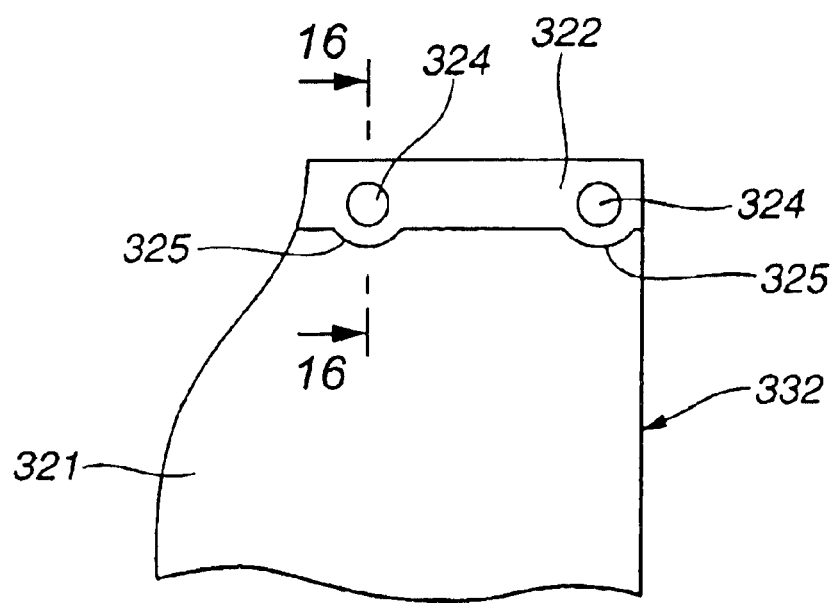
FIG. 15 is a plan view of one part of the lens barrier in FIG. 13, as observed from the rear.
Figure 16:
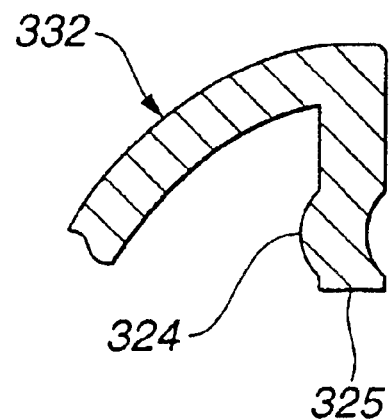
FIG. 16 is a sectional view at the line IV—IV of FIG. 15.
Figure 17:
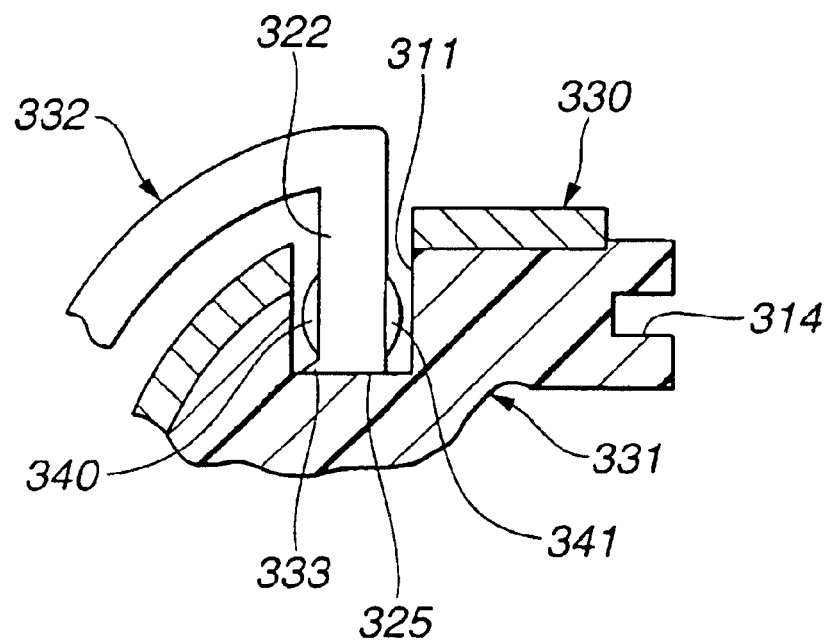
FIG. 17 is a partial sectional view of an essential part of a camera with a lens barrier according to a fifth embodiment of the present invention.
Figure 18:
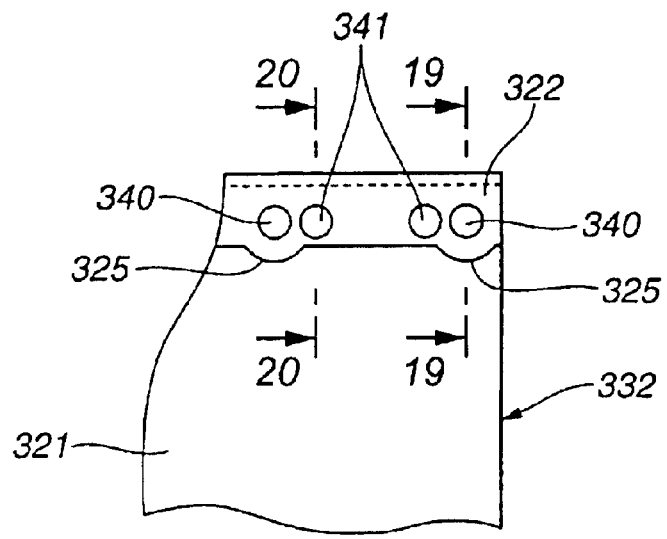
FIG. 18 is a plan view of a part of the lens barrier in FIG. 17, as observed from the rear.
Figure 19:
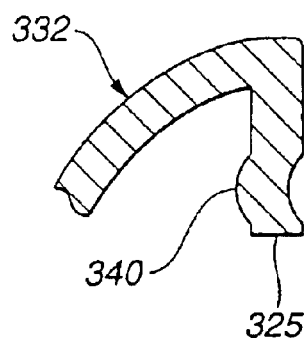
FIG. 19 is a sectional view at the line V—V of FIG. 18.
Figure 20:
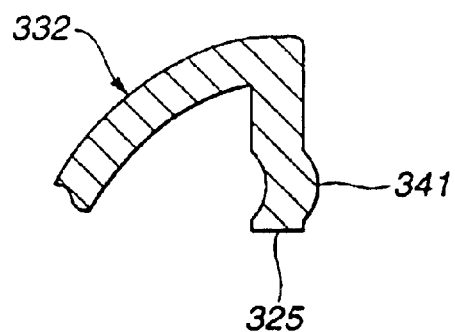
FIG. 20 is a sectional view at the line VI—VI of FIG. 18.

Each sliding portion 322 has a plurality of, e.g., two protrusions 324 which are almost hemispherical as shown in FIGS. 14 and 16. The protrusions 324 project in the vicinity of the end face of each sliding portion 322 perpendicular to the surface of the sliding portion 322. The protrusions 324 are formed higher than a burr 333 so as to correspond to the direction of generation of the burr 333, which may occur at the edge of the lens barrier 332 when the lens barrier 332 is cut in the press work step. In addition, round projections 325 are formed on the end face of each sliding portion 322 of the lens barrier 332 so as to correspond to the protrusions 324. The round projections 325 are freely movably come into contact with the bottom surface of the corresponding rail 311.

When the lens barrier 332 is moved in the direction shown by the arrow SA or SB, various switches such as a power switch and similar components (not shown) which are arranged on, for example, the front cover 330, are turned on or off at a position to which the lens barrier 332 is moved. At an open position where the lens-frame-unit accommodation hole 301 and the AF-finder-unit accommodation hole 302 of the front cover 330 are exposed to expose the surface of a photographic lens (not shown), a camera function is allowed to enter a photographing standby mode. At a closed position, a power supply is turned off.

In the above arrangement, the front mold 331 is attached to the inner surface of the front cover 330 in such a manner that the through hole 304 and the notch 305 are made to correspond to the respective rails 311 of the front mold 331 and they are adhered to each other using an adhesive.

In this state, for example, the sliding portion 322 on the upper portion of the lens barrier 332 is inserted into the through hole 304 of the front cover 330 and is then freely movably received in the rail 311 on the upper portion of the front mold 331. Subsequently, the sliding portion 322 on the lower portion of the lens barrier 332 is inserted through the notch 305 of the front cover 330 and is then freely movably received in the rail 311 on the lower portion of the front mold 331.

In this instance, the protrusions 323 of the upper and lower sliding portions 322 of the lens barrier 332 are come into contact with the sliding surfaces of the side walls of the respective rails 311 of the front mold 331. Simultaneously, the round projections 325 are come into contact with the respective bottom surfaces of the rails 311. Consequently, while the burr 333 formed at the edge of each sliding portion 322 is prevented from being in contact with the sliding surface as the side wall of the rail 311, the lens barrier 332 is freely movably attached to the front surface of the front cover 330 in the directions shown by the arrows SA or SE.

When the lens barrier 332 is moved in the direction shown by the arrow SA, the round projections 325 of the respective sliding portions 322 are guided by the bottom surfaces of the rails 311 of the front mold 331 and the projections 324 are guided by the sliding surfaces as the side walls of the rails 311 of the front mold 331. Consequently, the lens barrier 332 is moved to the closed position where the lens-frame-unit accommodation hole 301 and the AF-finder-unit accommodation hole 302 of the front cover 330 are covered. In this instance, the front surface of the photographic lens (not shown) disposed through the lens-barrel-unit accommodation hole 301 is covered with the closing portion 321 of the lens barrier 332.

When the lens barrier 332 is moved from the closed position in the direction shown by the arrow SB, similarly, the round projections 325 of the respective sliding portions 322 are guided to the bottom surfaces of the rails 311 of the front mold 331 and the respective projections 324 are guided to the sliding surfaces of the rails 311 of the front mold 331. Consequently, the lens barrier 332 is moved to the open position where the lens-barrel-unit accommodation hole 301 and the AF-finder-unit accommodation hole 302 of the front cover 330 are exposed. In this instance, the front surface of the photographic lens (not shown) disposed through the lens-barrel-unit accommodation hole 301 is exposed. Thus, it is in a photographable mode.

As mentioned above, the camera with the lens barrier is constructed as follows: The protrusions 324 are formed in the vicinity of the end face of each sliding portion 322 of the lens barrier 332, which is made of a metal plate and is freely movably attached to the front surface of the front cover 330 between the closed position where the front surface of the photographic lens is covered and the open position where the front surface of the photographic lens is exposed, the protrusions 324 projecting higher than the burr 333 formed at the edge perpendicular to the surface of the lens barrier 332. When the lens barrier 332 is moved on the rails 311, the protrusions 324 of the sliding portions 322 are moved in contact with the sliding surfaces of the respective rails 311 of the front mold 331.

Accordingly, when the lens barrier 332 is slid, the protrusions 324 are guided and slid while being in contact with the surfaces of the rails 311. Thus, the edges of the end faces of the lens barrier 332 are not in contact with the surfaces of the rails 311 and the lens barrier 332 is moved. Therefore, in the manufacture of the lens barrier 332 using a metal plate, the edges of the end faces of the sliding portions 322 formed on the upper and lower ends of the lens barrier 332 need not to be especially worked. The stable moving operation can be accomplished and the simple manufacture can be realized.

Figure 21:
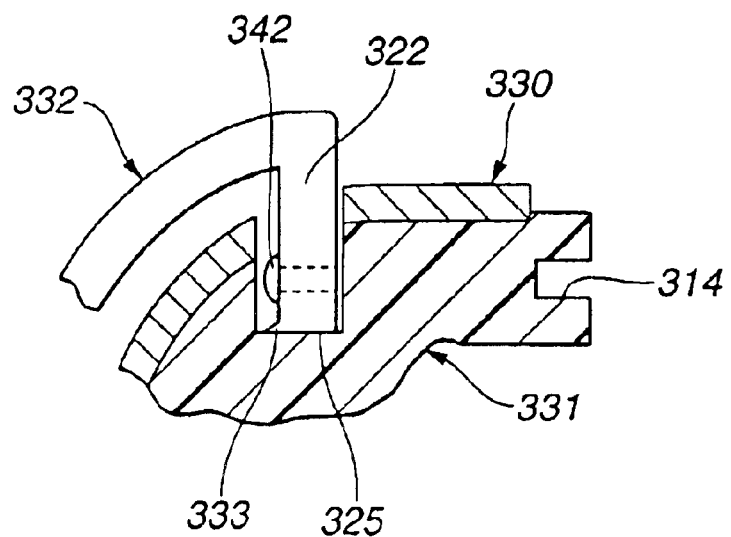
FIG. 21 is a partial sectional view of an essential part of a camera with a lens barrier according to a sixth embodiment of the present invention.
Figure 22:
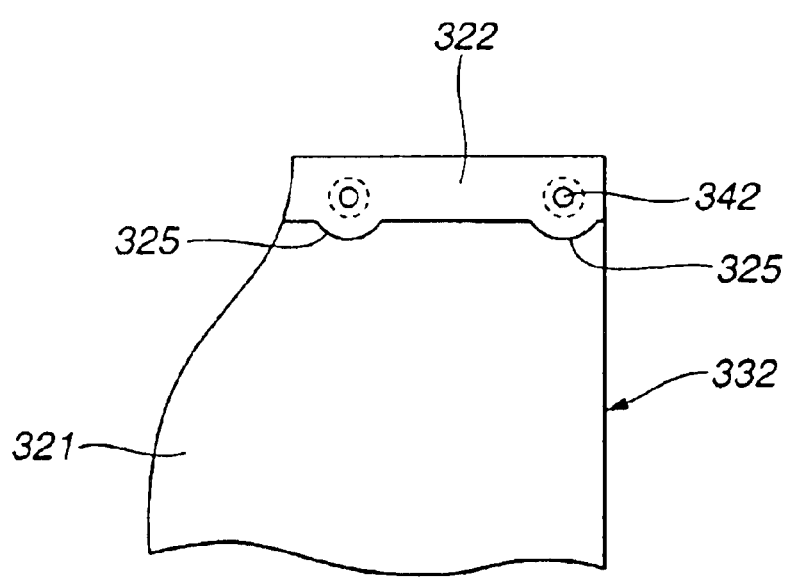
FIG. 22 is a plan view of a part of the lens barrier in FIG. 21, as viewed from the rear.

The present invention is not limited to the above embodiments. In addition to this, an arrangement as shown in FIGS. 17 to 20 and an arrangement as shown in FIGS. 21 and 22 are possible. In FIGS. 17 to 22, the same components as those in FIGS. 13 to 16 are designated using the same reference numerals to omit the detailed description regarding the components.

In other words, according to a fifth embodiment shown in FIGS. 17 to 20, on each of both the surfaces of each of the upper and lower sliding portions 322 of the lens barrier 332, two first protrusions 340 and two second protrusions 341 protruding in opposite directions (only the upper portion is shown in views of circumstances of the drawings) are formed at predetermined intervals. Accordingly, when the lens barrier 332 is moved on the rails 311 of the front mold 331, the first and second protrusions 340 and 341 can prevent the burrs generated upon forming the lens barrier 332 and the edges of the sliding portions 322 from being in contact with the inner walls of the rails 311. According to a sixth embodiment shown in FIGS. 21 and 22, substantially hemispherical protrusions 342, made of a resin, are formed in the vicinity of the end faces of the upper and lower sliding portions 322 of the lens barrier 332 (only the upper portion is shown in views of circumstances of the drawings) so as to protrude perpendicular to the surface of the sliding portions 322. In this case, the protrusions 342 are formed on the sliding portions 322 of the lens barrier 332 by pressing. Alternatively, the protrusions 342 are arranged on the sliding portions 322 by adhesion. According to the present embodiment, the protrusions 342 can also be arranged perpendicular to the surfaces of each sliding portion 322 in opposite directions in the same way as the foregoing embodiment described with reference to FIGS. 17 to 20.

The above fourth, fifth, and sixth embodiments have been described with the case where the protrusions 324, 340, 341, and 342 are formed in an almost hemisphere. The shape is not limited to this case. In addition to this, various shapes such as polygons can be used.

Furthermore, the above embodiments have been described with the case where the round projections 325 are formed at the end face of each of the sliding portions 322 of the lens barrier 332 and the round projections 325 are slid on the bottom surface of each of the rails 311. The arrangement is not limited to this case. An arrangement having no round projection 325 can also be realized.

The above embodiments have been described with the case where the present invention is applied to the case component which is composed of the front cover 330 and the front mold 331, the front mold 331 being attached to the inner surface of the front cover 330. The present invention is not limited to the case component and other arrangements can be realized.

Accordingly, the present invention is not limited to the above fourth to sixth embodiments. In addition to these, various modifications are possible without departing from the spirit of the invention in embodying stages. Further, since the above embodiments include various stages of the invention, various inventions may be obtained by the appropriate combinations of the disclosed components.

For example, if some components are eliminated from all the components disclosed in the above embodiments, the arrangement excluding the eliminated components may be included in the present invention so long as the disadvantages, described in the paragraph regarding the problems that the present invention is to solve, can be overcome and advantages, which will be described in a paragraph regarding advantages of the invention, are obtained.

As described in detail, according to the foregoing fourth, fifth, and sixth embodiments, it is possible to provide a camera with a lens barrier which can be easily and simply manufactured with high quality without performing edge processing.

Figure 23:
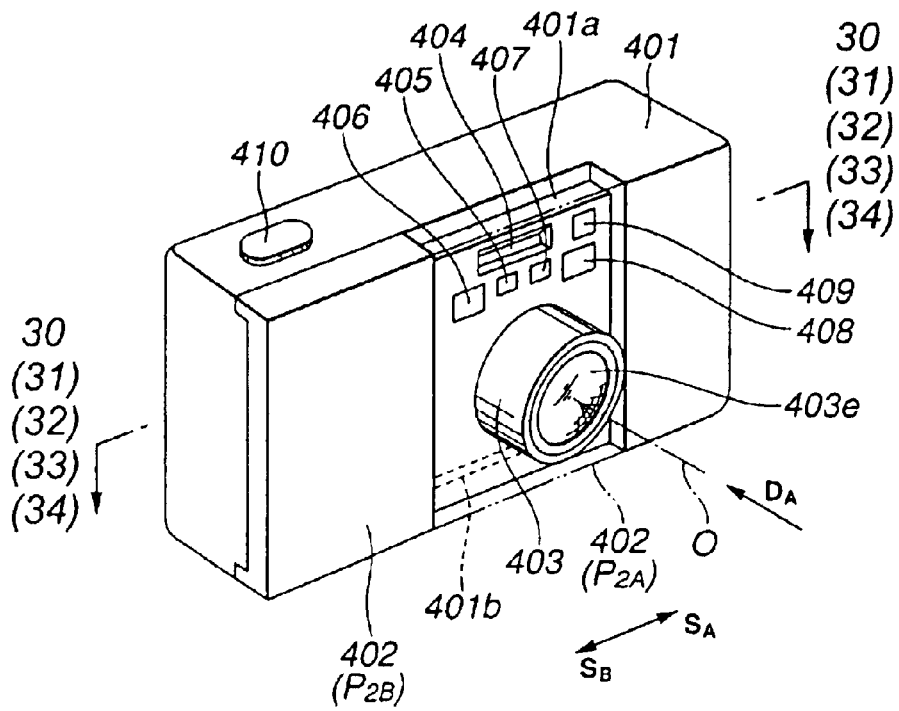
FIG. 23 is a perspective view of a camera with a barrier according to a seventh embodiment of the present invention, the barrier being opened.
Figure 24:
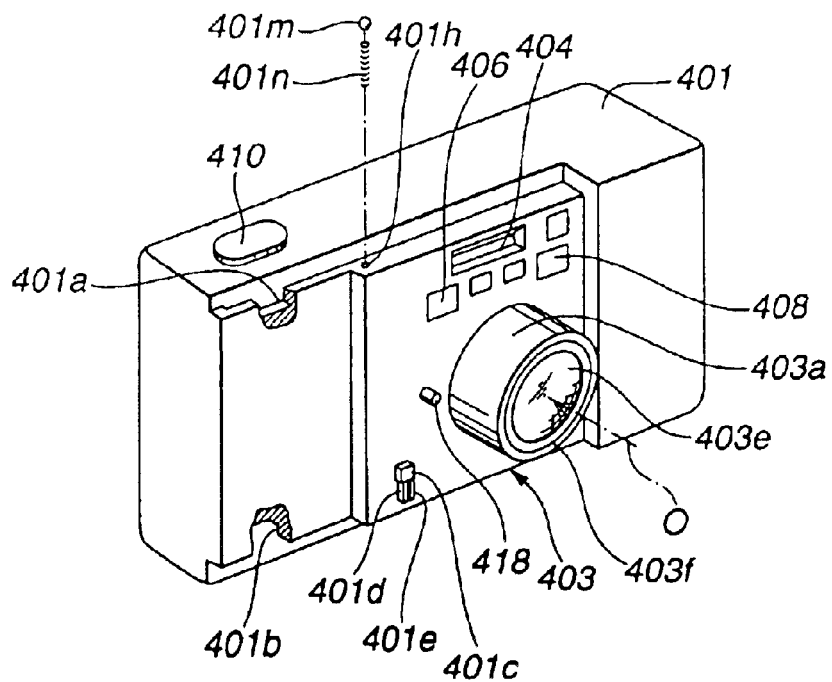
FIG. 24 is an exploded perspective view of the camera with the barrier in FIG. 23, the camera being in a photographing mode and the barrier being detached from the camera.
Figure 25:
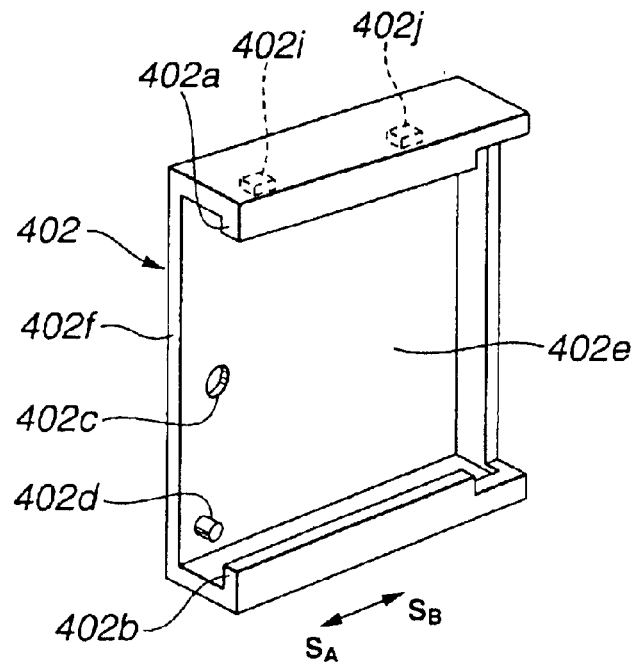
FIG. 25 is a perspective view of the barrier to be attached to the barrier-attached camera of FIG. 23, as observed from the inner side opposite to the direction DA in FIG. 23.
Figure 26:
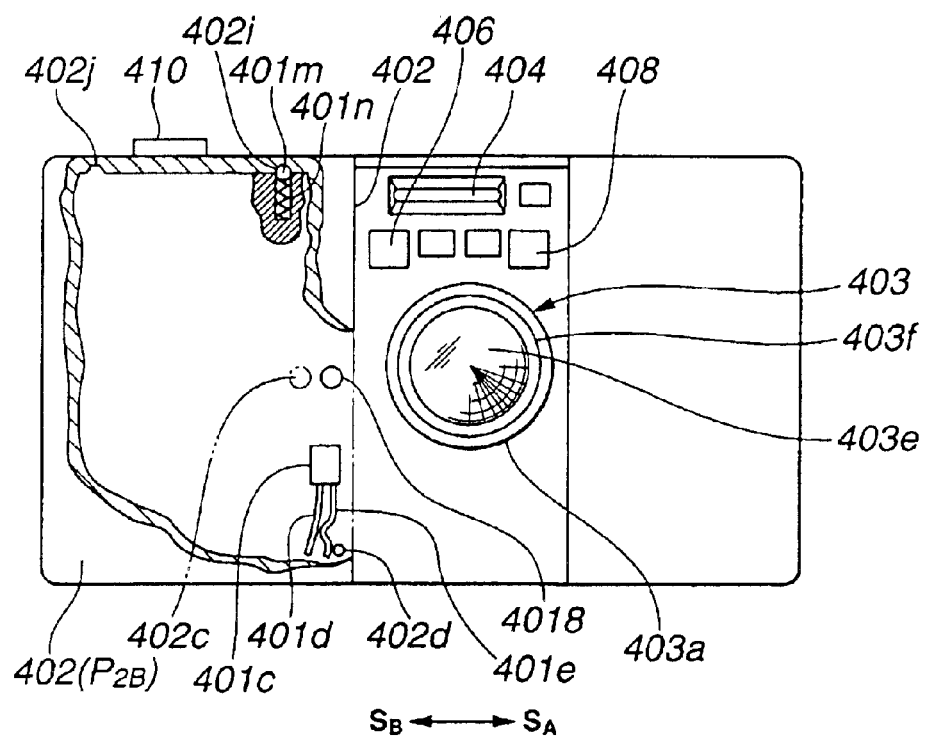
FIG. 26 is a front elevation of the barrier-attached camera of FIG. 23, as observed in the direction DA in FIG. 23, the barrier being opened.
Figure 27:
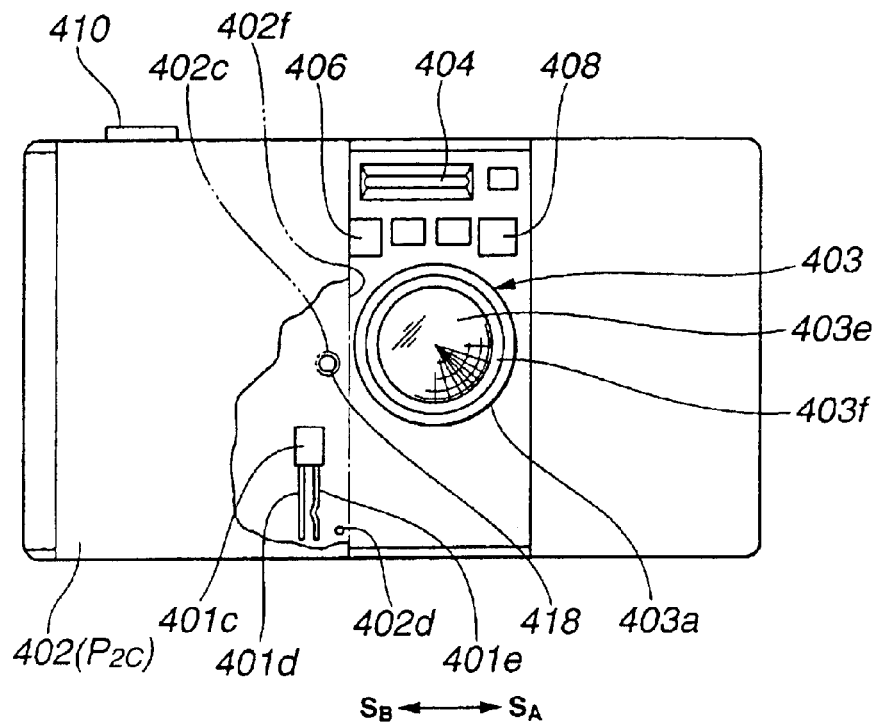
FIG. 27 is a front elevation of the barrier-attached camera of FIG. 23, as observed in the direction DA in FIG. 23, the barrier being in a semi-open mode.
Figure 28:
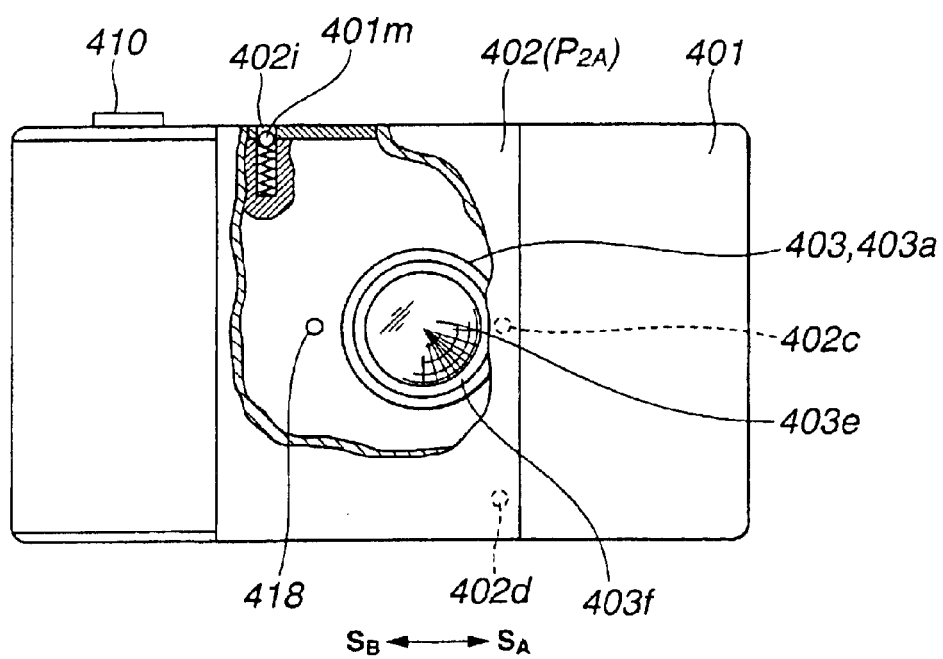
FIG. 28 is a front elevation of the barrier-attached camera of FIG. 23, as viewed in the direction DA in FIG. 23, the barrier being closed.

FIG. 23 is a perspective view of a camera having a lens barrier (hereinbelow, referred to as a barrier) according to a seventh embodiment of the present invention, the barrier being opened. FIG. 24 is an exploded perspective view of the camera from which the barrier is detached and which is in a photographable mode. FIG. 25 is a perspective view of the barrier to be attached to the camera as viewed from the inside and in the direction opposite to the direction DA of FIG. 23. FIGS. 26 to 28 are front views showing the opening and closing mode of the barrier as viewed from the direction DA in FIG. 23. FIG. 26 shows the barrier opening mode. FIG. 27 shows the barrier semi-opening mode. FIG. 28 shows the barrier closing mode.

In the following description, it is assumed that a subject side of the camera is set to a front side and an image formation side is set to a rear side. It is also assumed that the direction of movement of the barrier toward the closed position is set to the direction SA and the direction of movement toward the open position is set to the direction SB.

According to the present embodiment, as shown in FIG. 23, the barrier-attached camera comprises a barrier 402 capable of moving between a closed position P2A (FIG. 28), where the front surface of a photographic lens in a stored position on the front surface of a camera body 01 is covered, and an open position P2B (FIG. 26), where the front surface of the photographic lens in a photographing position is exposed, through a semi-open position P2C (FIG. 27) where the barrier is locked.

A photographic lens barrel (hereinbelow, referred to as a lens barrel) 403 is driven forward and backward between a collapsed position serving as a non-photographable position and the photographing position serving as a photographable position, together with the opening and closing operations of the barrier 402 under the control.

The path of movement of the photographic lens barrel 403 between the photographing position and the stored position is set to a lens movement path. The path of movement of the barrier 402 between the closed position and the open position is set to a barrier movement path.

The barrier movement path intersects the lens movement path. When the lens barrel 403 is located in the stored position, the lens barrel 403 is deviated from the barrier movement path. When the photographic lens barrel 403 is located in the photographing position, the lens barrel 403 is positioned on the barrier movement path. In other words, when the barrier 402 is located in the open position, the barrier 402 is deviated from the lens movement path of the photographic lens barrel 403. When the barrier 402 is located in the closed position, the barrier 402 is positioned on the lens movement path of the photographic lens barrel 403.

In the camera according to the present embodiment, on the upper and lower portions of the front surface of the camera body 401 also serving as an exterior part as shown in FIGS. 23 and 24, guide grooves 401a and 401b for slidably supporting the barrier 402 are formed in parallel to each other so as to extend in the lateral direction.

The lens barrel 403 is arranged at the center of the front surface of the camera body 401. The lens barrel 403 is freely movable forward and backward along an optical axis 0. A flash window 404, a finder window 405, a distance-measurement receiving window 406, a distance-measurement projecting window 408, a photometric window 407, and a self-timer indication window 409 are arranged at the upper portion of the lens barrel 403. When the barrier 402 is located in the closed position P2A (FIG. 28), the received lens barrel and the windows from the distance-measurement receiving window 406 to the self-timer indication window 409 are completely covered.

A release button 410 for operating a release switch 410a (refer to FIG. 35) is disposed on the upper surface of the camera body 401.

As shown in FIG. 24, a locking shaft 418 of a locking member is arranged on the left of the lens barrel 403 on the front surface of the camera body 401, the distal end of the locking shaft 418 being retractable. A barrier detection switch 401c comprising contacts 401d and 401e to detect the opening or closing state of the barrier 402 is arranged below the locking shaft 418. A small hole 401h is formed on the upper portion of the front surface of the camera body 401. A click spring 401n and a click ball 401m which perform the click-stop operation to the barrier 402 are fitted in the small hole 401h.

As shown in FIG. 25, in the barrier 402, engaging guides 02a and 02b are formed at the upper and lower flanged edges thereof. An engagement hole 402c and a protrusion 402d are arranged on an inner surface 402e in the vicinity of the end face in the closing direction of the barrier 402f. Two click recesses 402i and 402j are formed on the inner surface of the upper flanged edge.

The guides 402a and 402b are freely slidably fitted in the guide grooves 401a and 401b of the camera body 401, respectively. The protrusion 402d functions to press the contact 401e of the barrier detection switch 401c arranged on the camera body 401.

When the barrier 402 is in the open position P2B, the protrusion 402d presses the contact 401e and allows the contact 401e to come into contact with the contact 401d, thus turning the barrier detection switch 401c on. Due to an ON signal of the switch 401c, projecting the lens barrel 403 to the photographable position is started. When the barrier 402 is moved from the open position P2B to the semi-open position P2C, the contact 401e is released to turn the barrier detection switch 401c off (refer to FIGS. 27 and 32). Due to an OFF signal of the switch 401c, retracting the lens barrel 403 is started. The barrier detection switch 401c is always covered with the barrier 402 and is never exposed irrespective of whether the barrier 402 is open or closed.

The click ball 401m, fitted in the small hole 401h on the upper portion of the camera body 401, falls into the click recess 402i or 402j and clicks, thus stopping the barrier 402 at a predetermined position. In other words, when the ball 401m is fitted into the click recess 402i, the barrier 402 is click-held at the open position P2B. When the ball 401m is fitted into the click recess 402j, the barrier 402 is click-held at the closed position P2A.

The engagement hole 402c has a bottom. The end of the locking shaft 418 projected from the camera body 401 can be fitted into the engagement hole 402c. In the state in which the lens barrel 403 is in the photographing state, when the barrier 402 is slightly moved form the open position P2B in the direction SA, the distal end of the locking shaft 418 projected and pressed is fitted into the engagement hole 402c. The position of the barrier 402 where the locking shaft 418 is fitted into the engagement hole 402c is the semi-open position P2C. The locking shaft 418 inhibits the barrier 402 from further moving in the direction SA, thus preventing the end face 402f of the barrier 402 from coming into contact with the periphery of the lens barrel 403.

Figure 29:
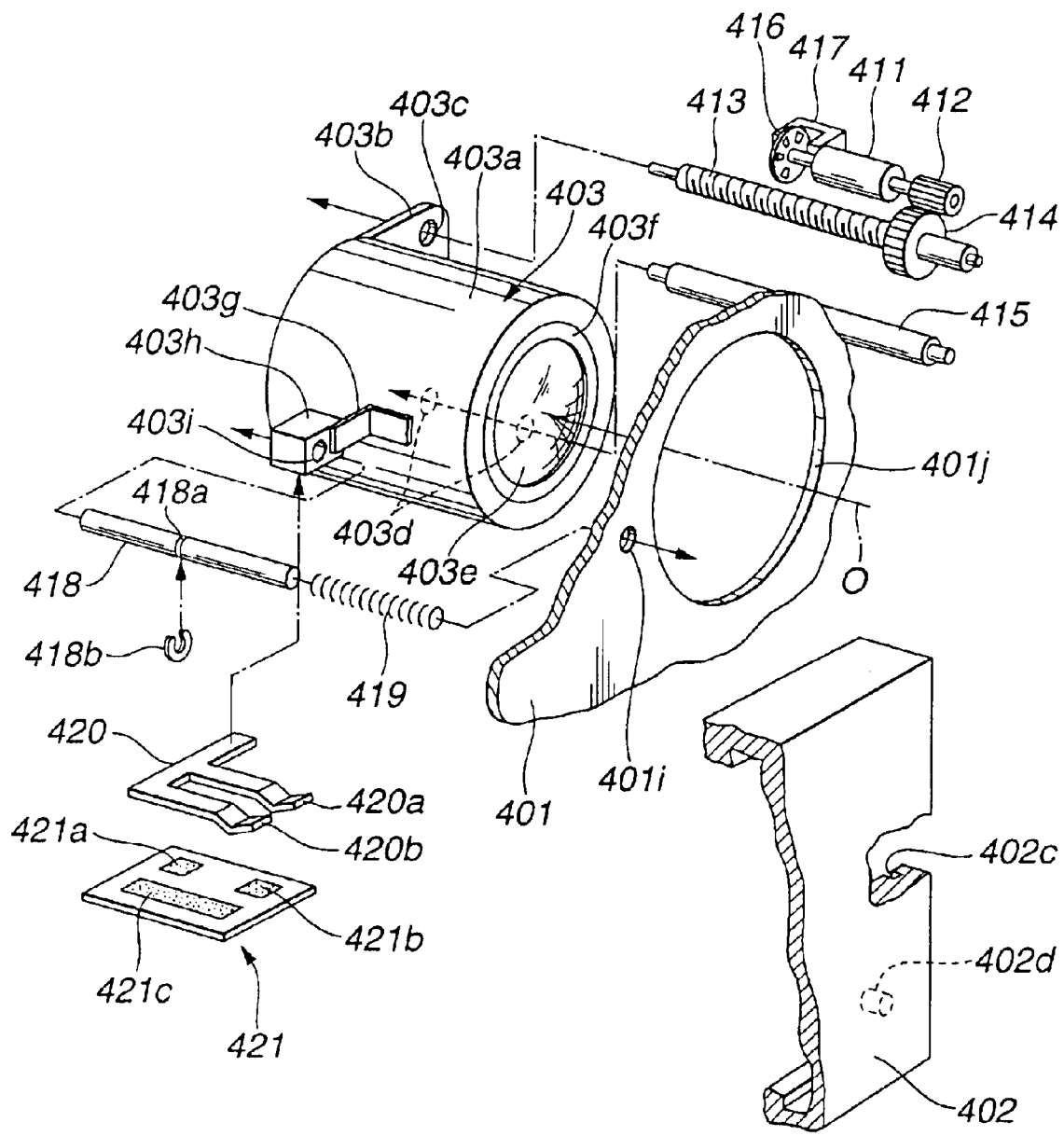
FIG. 29 is an exploded perspective view of a locking member and components surrounding a lens barrel of the barrier-attached camera of FIG. 23.
Figure 30:
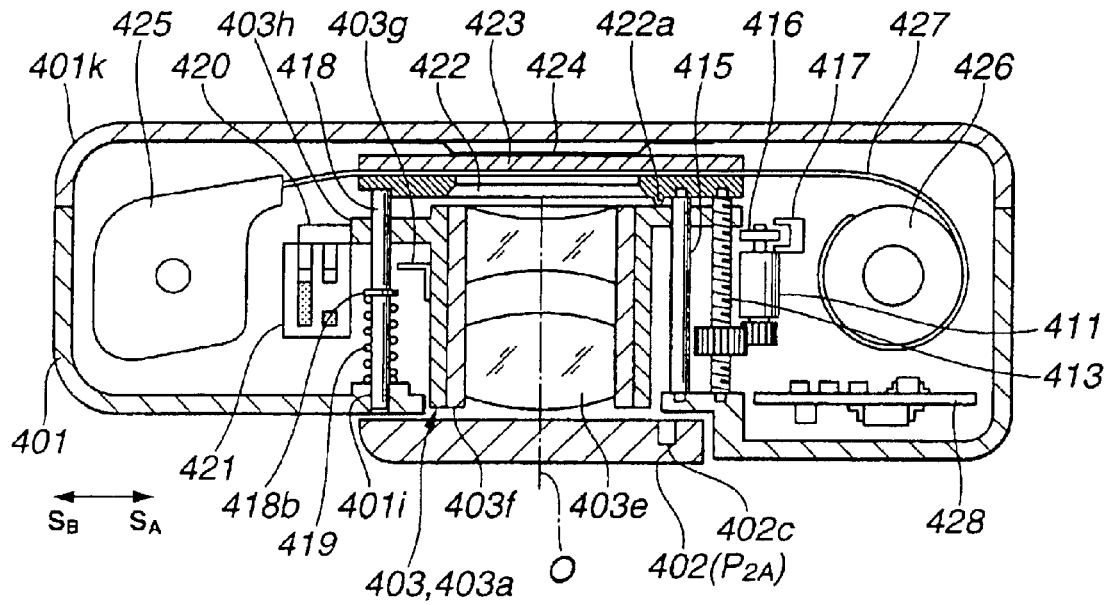
FIG. 30 is a sectional view of the barrier-attached camera of FIG. 23 at the line VII—VII of FIG. 23, the barrier being closed and the lens barrel being in a collapsed position.

The driving mechanism of the lens barrel 403 and the locking mechanism of the locking shaft 418 and surroundings will now be described in detail with reference to FIGS. 29 and 30. FIG. 29 is an exploded perspective view of the locking shaft, the lens barrel, and surroundings. FIG. 30 is a longitudinal sectional view of the camera in the respective operating states.

The lens barrel 403 comprises a zoom frame 403f and a movable frame 403a for movably holding the zoom ring 403f.

The lens barrel 403 is fitted in an opening 401j of the camera body 401 and is freely slidably supported along a guide shaft 415, which is supported by the camera body 401 and is parallel to the photographic-lens optical axis 0. The lens barrel 403 is driven forward and backward by a feed screw 413 arranged in parallel to the guide shaft 415. When the lens barrel 403 is retracted to the stored position in the camera body 401, a flange 403b of the lens barrel 403 comes into contact with a protrusion 422a of an aperture member 422 fixed to the camera body 401 upon collapsing the lens barrel. A pressure plate 423 and a pressure-plate spring 424 are disposed between the aperture member 422 and a rear cover 401k (FIG. 30).

Figure 35:
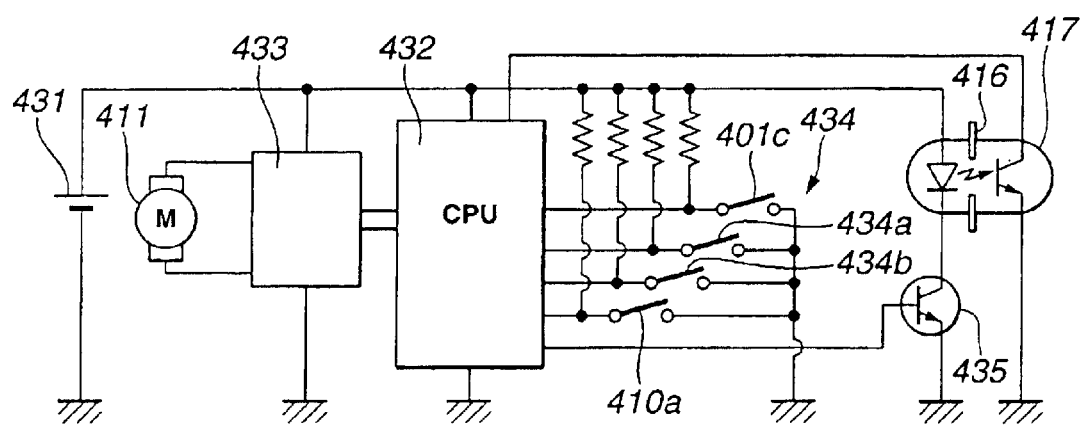
FIG. 35 shows a lens-barrel control unit and primary electrical control circuits of various detection switches of the barrier-attached camera of FIG. 23.

The feed screw 413 is fitted into a screw hole 403c formed on the flange 403b of the movable frame 403a so as to be rotatably supported between the aperture member 422 and the camera body 401. A gear 414 to be engaged with a pinion 412 of a drive motor 411 is fixed to one end of the feed screw 413. The guide shaft 415 is supported between the aperture member 422 and the camera body 401 and is slidably fitted in a guide hole 403d of the movable frame 403a. Accordingly, when the drive motor 411 rotates, the feed screw 413 rotates, 80 that the movable frame 403a of the lens barrel 403 is driven forward or backward along the guide shaft 415. A slit plate 416 is fixed to an output shaft of the drive motor 411. A photo-interrupter 417 detects the amount of rotation of the slit plate 416. An output signal of the photo-interrupter 417 is supplied to a CPU 432, which will be described later (FIG. 35/13).

A shaft supporting base 403h for slidably supporting the locking shaft 418 and a pressure spring 403g comprising a plate spring for pressing and driving the locking shaft 418 are arranged on the side of the movable frame 403a.

The locking shaft 418 is a locking member comprising a long stick-like member as shown in FIGS. 29 and 30. The locking shaft 418 is freely slidably supported in parallel to the optical axis 0 by a supporting hole 403i of the shaft supporting base 403h on the movable frame 403a and a side supporting hole 401i of the camera body 401. A stopper 418b is attached to the locking shaft 418. The stopper 418b is fitted in a groove 418a arranged at a predetermined position forward from the shaft supporting base 403h. A return spring 419 serving as a pressing member comprising a compression spring is arranged between the stopper 418b of the locking shaft 418 and the supporting hole 401i of the camera body 401. The return spring 419 presses the locking shaft 418 backward (in the direction in which the locking shaft 418 is not engaged with the barrier 402).

The distal end of the pressure spring 403g arranged on the movable frame 403a comes into contact with the stopper 418b of the locking shaft 418 depending on the position of the movable frame 403a which is projected or retracted. The contact permits the locking shaft 418 to move forward. The control pressing force of the pressure spring 403g is set to be larger than the pressing force of the return spring 419 in the predetermined relative positioning range between the movable frame 403a and the locking shaft 416.

A slide contact 420 comprising a contact 420a and a common contact 420b is attached on the lower surface of the shaft supporting base 403h. The slide contact 420 moves along the optical axis 0 with the forward or backward movement of the movable frame 403a. A lens-barrel-position detection switch board 421 to be come into contact with the slide contact 420 is arranged on the bottom of the camera body 401 under the slide contact 420.

The lens-barrel-position detection switch board 421 is a board constituting a collapse switch (collapsed-position detection switch) 434a and a photographing-position detection switch 434b. The switch board 421 has a lens-barrel stored-position detection pattern 421a, a lens-barrel photographing-position detection pattern 421b, and a common pattern 421c. The contact 420a comes into contact with the pattern 421a and 421b. The common contact 420b comes into contact with the common pattern 421c. When the lens barrel 403 is in the stored mode, the contact 420a comes into contact with the pattern 421a. When the lens barrel 403 is in the photographable position, the contact 420a comes into contact with the pattern 421b. Output signals generated by the contacts are supplied as an output signal of the collapsed-position detection switch 434a and an output signal of the photographing-position detection switch 434b of the lens barrel to a CPU 432 (FIG. 35). The switches 434a and 434b will be described later.

The projecting and retracting operations of the lens barrel interlocked with the opening and closing operations of the barrier in the barrier-attached camera with the above-mentioned structure according to the present embodiment will now be described with reference to FIGS. 26 to 34.

Figure 31:
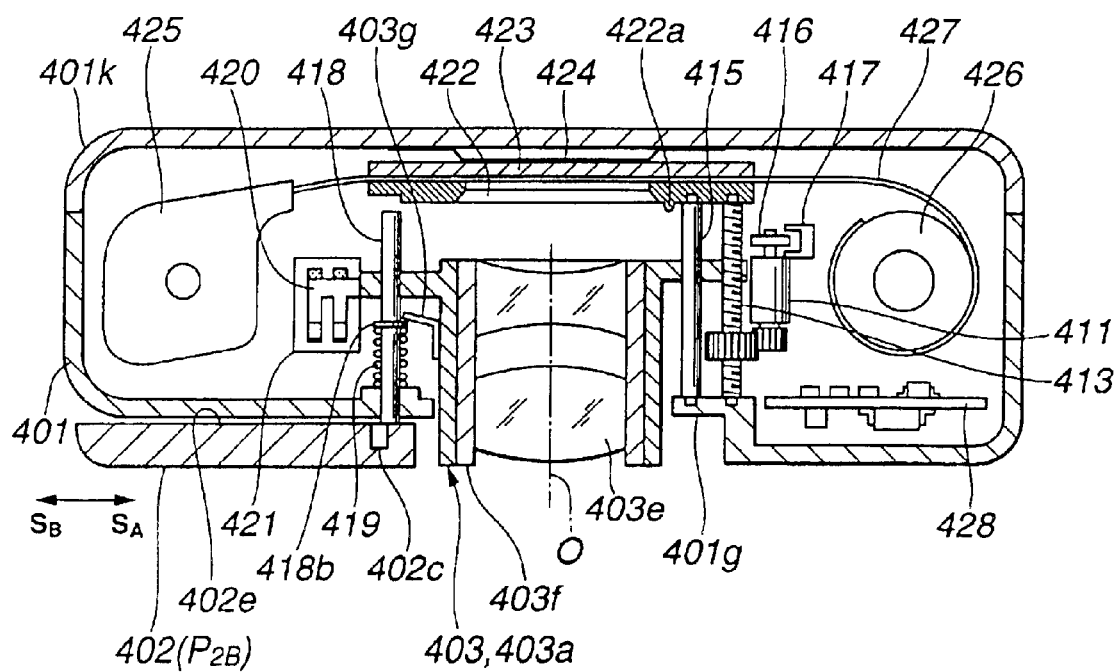
FIG. 31 is a sectional view of the barrier-attached camera of FIG. 23 at the line VII—VII of FIG. 23, the barrier being opened and the lens barrel being in a photographing position.
Figure 32:
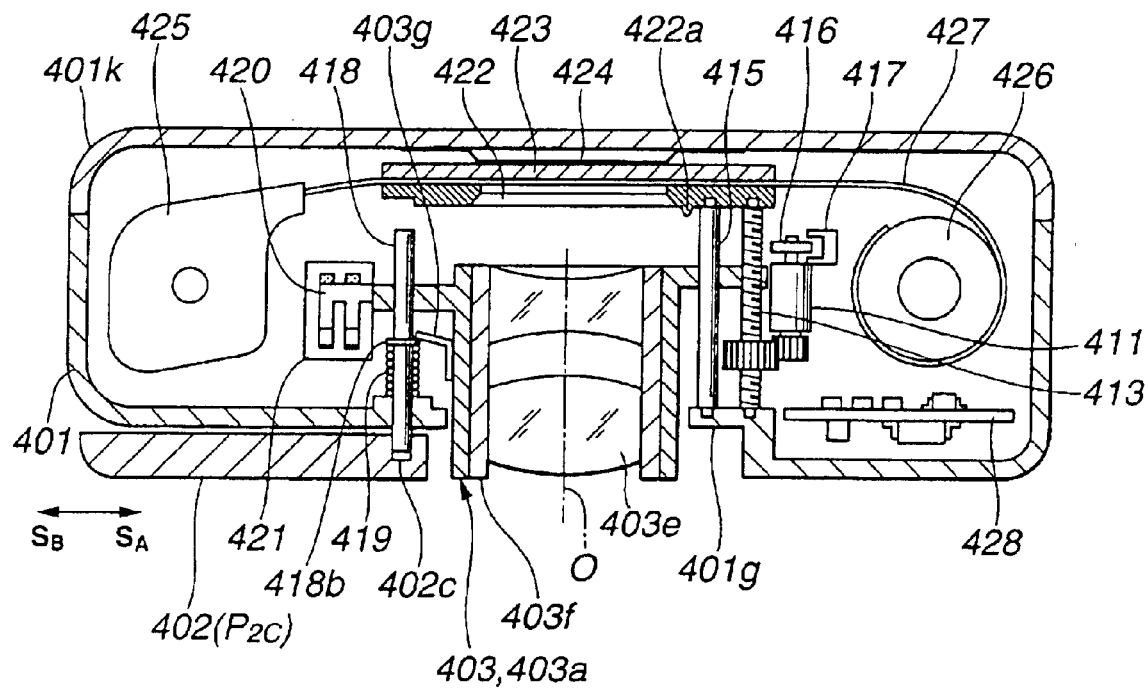
FIG. 32 is a sectional view of the barrier-attached camera of FIG. 23 at the line VII—VII of FIG. 23, the barrier being in a semi-open position and the lens barrel being in the photographing position.
Figure 33:
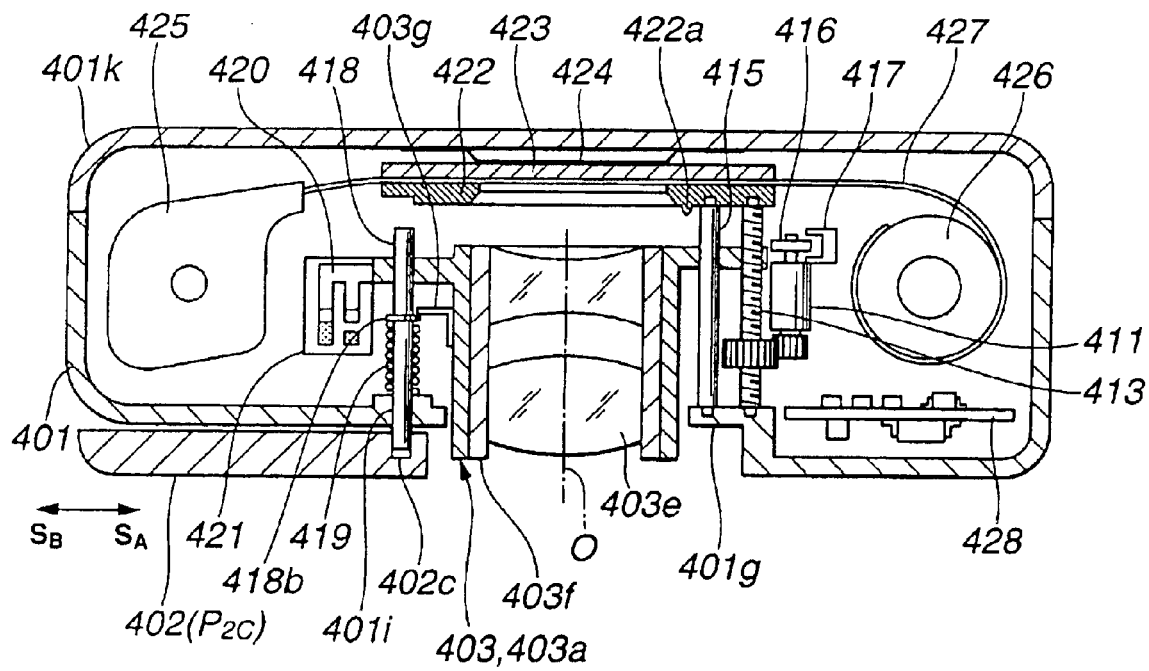
FIG. 33 is a sectional view of the barrier-attached camera of FIG. 23 at the line VII—VII in FIG. 23, the barrier being in the semi-open position and the lens barrel being retracting.
Figure 34:
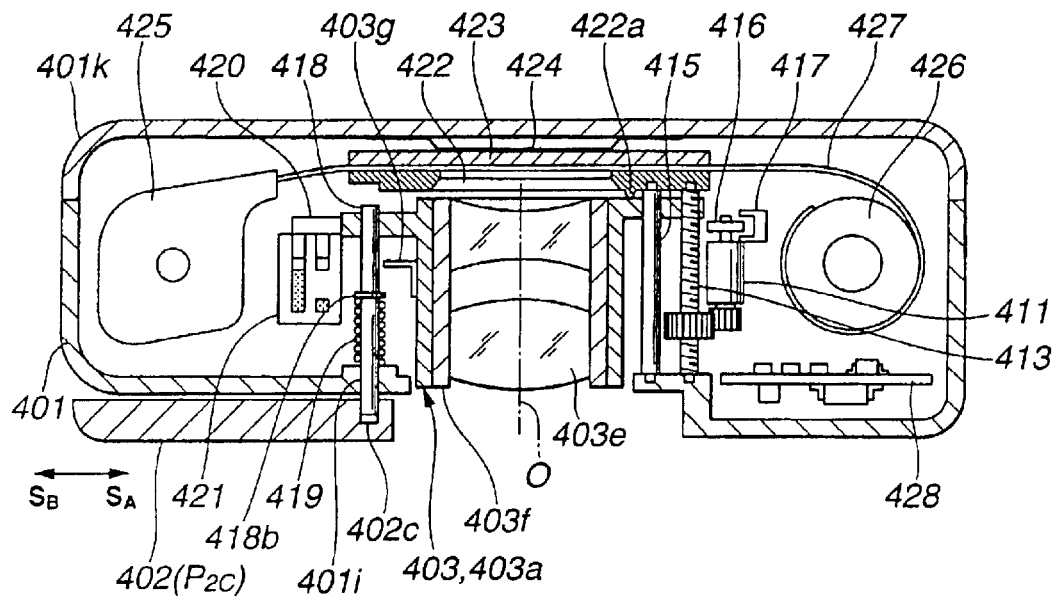
FIG. 34 is a sectional view of the barrier-attached camera of FIG. 23 at the line VII—VII of FIG. 23, the barrier being in the semi-open position and the lens barrel being retracted in the stored position.

FIGS. 30 to 34 show sectional views of the barrier and the lens barrel in the respective operating states, the views being taken along the line VII—VII of FIG. 23. FIG. 30 shows a state in which the barrier is in the closed position and the lens barrel is retracted in the stored position. FIG. 31 shows a state in which the barrier is in the open position and the lens barrel is in the photographing position. FIG. 32 shows a state in which the barrier is in the semi-open position and the lens barrel is in the photographing position. FIG. 33 shows a state in which the barrier is in the semi-open position and the lens barrel is being retracted to the stored position. FIG. 34 shows a state in which the barrier is in the semi-open position and the lens barrel is retracted in the stored position.

As shown in FIGS. 28 and 30, when the barrier 402 is in the closed position P2A and the lens barrel 403 is retracted in the collapsed position, the return spring 419 presses the locking shaft 418 backward, so that the locking shaft 418 comes into contact with the aperture member 402. In this state, the distal end of the locking shaft 418 is received within the supporting hole 401i of the camera body 401. Accordingly, the barrier 402 is openable.

As shown in FIGS. 26 and 31, when the barrier 402 is in the open position P2B and the lens barrel 403 is projected to the photographable position, the pressure spring 403g presses the locking shaft 418 against the pressing force of the return spring 419. Thus, the distal end of the locking shaft 418 comes into contact with the inner surface of the barrier 402.

In the state in which the lens barrel is in the photographing position, when the barrier 402 is slightly slid from the open position P2B in the direction SA, namely, the barrier 402 is moved from the state shown in FIG. 31 to the semi-open position P2C shown in FIG. 32, the barrier detection switch 401c is released from the pressure by the barrier protrusion 402d. An OFF signal of the switch 401 is output to the CPU 32 (refer to FIG. 35). Due to the output, the retracting operation of the lens barrel 03 to the stored position is started.

At this time, the distal end of the locking shaft 418 is fitted into the engagement hole 402c of the barrier 402 by the pressing force of the pressure spring 403g and the barrier 402 is locked at the semi-open position P2C, 80 that the barrier 402 cannot further move in the direction SA. Consequently, the distal end face 402f of the barrier 402 never comes into contact with the periphery of the lens barrel 403 located at the photographing position or projected from the camera body 401, thus protecting the lens barrel 403. Simultaneously, overload is not applied to the drive motor 411 and the lens barrel is normally retracted.

Following the state shown in FIG. 33, the lens barrel 403 is retracted to the collapsed position shown in FIG. 34. For a period during which the lens barrel 403 is being retracted to the collapsed position, the locking shaft 418 is moved to the collapsed position together with the lens barrel 403 in association with the retraction of the pressure spring 403g until the lens barrel 403 reaches a predetermined position. However, after the rear end face of the locking shaft 418 comes into contact with the aperture member 422, the pressure spring 403g is moved away from the stopper 418b of the locking shaft 418, thus releasing the interlocking operation. In this state, the lens barrel 403 is already stored in the camera body. The distal end of the locking shaft 418 is stored within the supporting hole 401i of the camera body 401, thus releasing the lock of the barrier 402.

During the retracting operation of the lens barrel 403 to the collapsed position, if the operating force is continuously applied to the barrier 402 in the direction SA, a frictional holding power is generated in the direction perpendicular to the locking shaft 418 by the engagement hole 402c of the barrier 402 and the frictional holding power acts on the distal end of the locking shaft 418 as shown in FIGS. 33 and 34. Consequently, the distal end of the locking shaft 418 is held in the engagement hole 402c of the barrier 402, while being engaged therewith. Thus, the barrier 402 is held as it is locked. Therefore, there is no adverse effect on the retracting operation of the lens barrel 403 to the collapsed position.

As mentioned above, the operating force applied to the barrier 402 in the closing direction is continuously held and as a result functions as locking-state holding means, due to the mechanism of the contact between the periphery of the distal end of the locking shaft 418 and the inner surface of the engagement hole 402c of the barrier 402. In other words, the locking member moves together with the photographic lens barrel for a period during which the photographic lens barrel is moving to the photographable position. While the photographic lens barrel is moving to the non-photographable position, the interlocking relationship therebetween can be disconnected.

When the lens barrel 403 is retracted in the collapsed position and the operating force applied to the barrier 402 in the direction SA is eliminated, the engagement between the distal end of the locking shaft 418 and the engagement hole 402c of the barrier 402 is released as mentioned above, so that the pressing force of the return spring 418 moves the locking shaft 418 to a position where the locking shaft 418 does not project from the camera body 401. Thus, the barrier 402 can move to the closed position P2A.

In the state in which the lens barrel 403 is in the collapsed position as shown in FIG. 30, when the barrier 402 is moved in the direction SB up to the open position P2B, the barrier detection switch 401c is turned on and an output signal of the switch 401c is supplied to the CPU 432. Thus, projecting the lens barrel 403 to the photographing position is started.

For a period during which the lens barrel 403 is being projected to the photographable position, if the lens barrel 403 is projected beyond a predetermined position, the pressure spring 403g of the lens barrel 403 comes into contact with the stopper 418b of the locking shaft 418. After that, the locking shaft 418 is pressed by the pressure spring 403g against the pressing force of the return spring 419 and is moved forward together with the lens barrel 403. As the lens barrel 403 projects from the camera body, the locking shaft 418 is pressed such that the shaft also can project from the camera body. The lens barrel 403 reaches the photographing position and the distal end of the locking shaft 418 comes into contact with the inside of the barrier 402 as shown in FIG. 31.

In the state in which the lens barrel 403 is in the photographing position as shown in FIG. 31, when the barrier 402 is moved in the direction SA, the distal end of the locking shaft 418 is fitted into the engagement hole 402c of the barrier 402 by the pressing force of the pressure spring 403g as mentioned above. Thus, the barrier 402 is locked at the semi-open position P2C. Since the barrier 402 cannot further move in the direction SA, the interference between the barrier 402 and the lens barrel 403 can be avoided. When this state is held, the OFF signal of the barrier detection switch 401c is output as mentioned above, thus starting the retraction of the lens barrel 403 to the collapsed position.

The arrangement of a lens-barrel control unit serving as driving control means according to the present embodiment and the primary electric control circuits surrounding the respective detection switches in the camera will now be described using an electric circuit diagram of FIG. 35.

The camera according to the present embodiment is driven by a battery 431 serving as a power supply. The CPU 432 functions as control means for controlling the entire camera. A motor driver 433 is a part of driving means and is controlled by the CPU 432. The motor driver 433 drives the drive motor 411 to project or retract the lens barrel 403.

The CPU 432 receives an output signal of the stored-mode detection switch (collapse switch) 434a and an output signal of the photographing-position detection switch 434b, thus detecting the projecting or retracting state of the lens barrel 403, these switches being built in the camera body. The CPU 432 also receives an output signal of the barrier detection switch 401c to detect the release of the barrier 402. In addition, the CPU 432 receives an output signal of the release switch 410a which is operated by the release button 410 to start the sequence for photographing.

Figure 36:
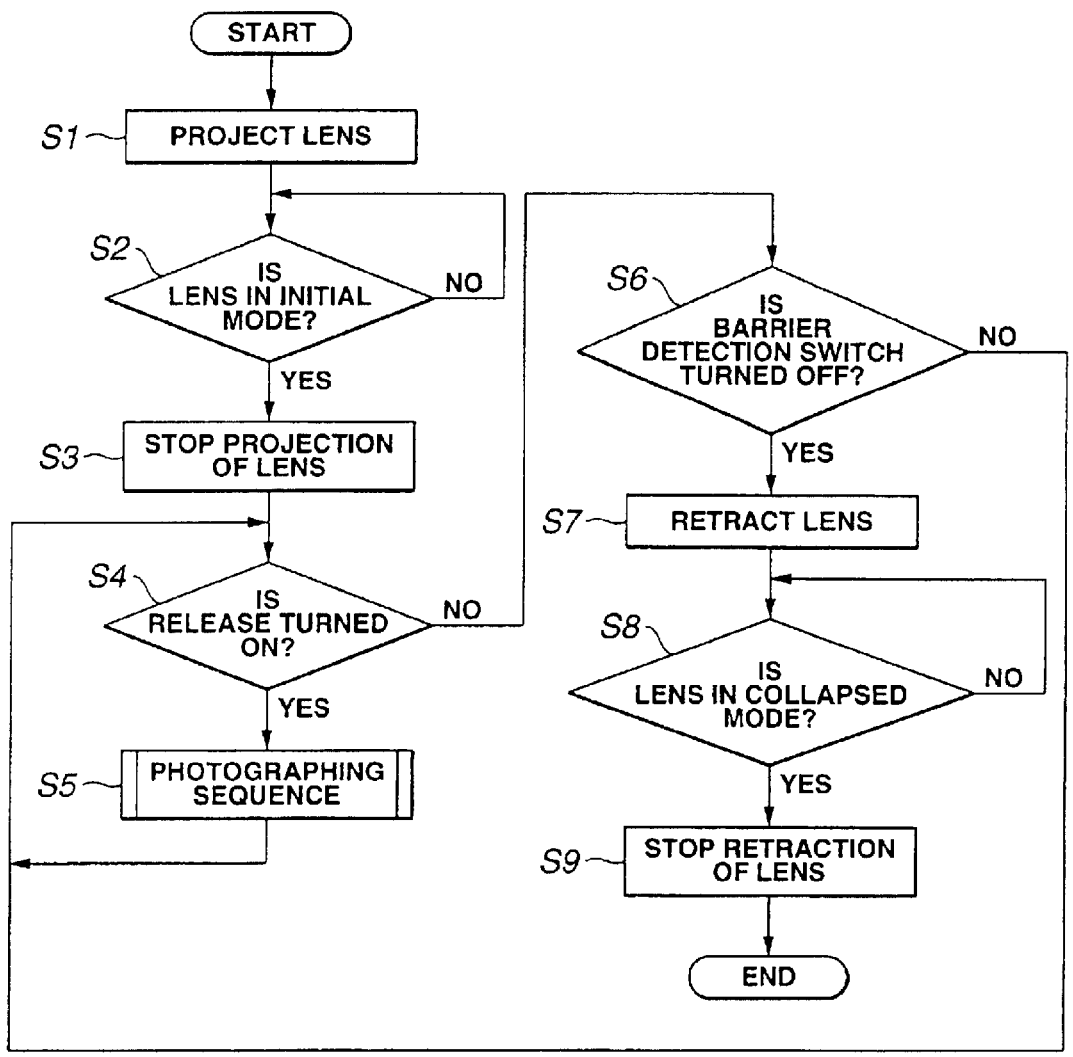
FIG. 36 is a general flowchart of a photographing process including the lens-barrel control operation interlocked with the opening or closing operation of the barrier in the barrier-attached camera of FIG. 23.
Figure 37:
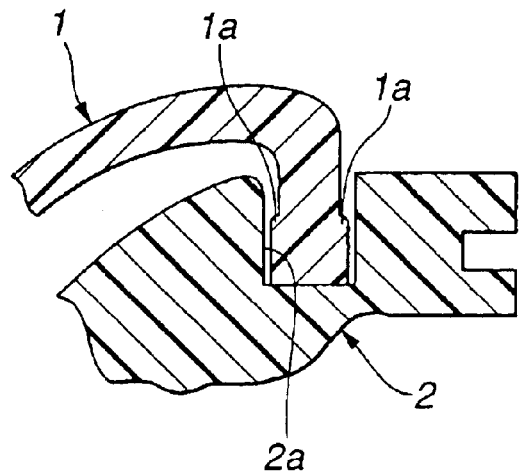
FIG. 37 is a sectional view of an essential part of a conventional camera with a lens barrier to explain the structure thereof.
Figure 38:
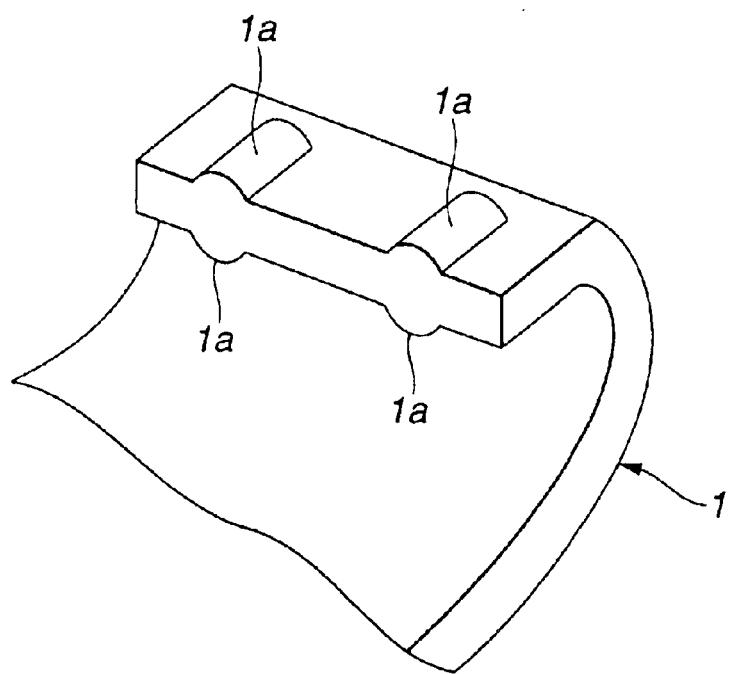
FIG. 38 is a perspective view of a part of the lens barrier in FIG. 37.

The control operation of a photographing process including the barrier opening and closing operations will now be described using a flowchart of FIG. 36. FIG. 34 is a general flowchart of the photographing process including the control operation of the lens barrel 403 upon opening and closing the barrier in the camera according to the present embodiment.

When the barrier 402 is moved from the closed position of the barrier 2 to the open position P2B by the manual operation, the barrier detection switch 401c is turned on. In other words, the contact 401d comes into contact with the contact 401e, thus starting the photographing process of FIG. 36 through the CPU 432.

In step S1, the CPU 432 transmits a driving signal to the motor driver 433, thus projecting the lens barrel 403, which is collapsed in the camera, toward the photographing position (photographing standby position) through the drive motor 411.

In step S2, on the basis of the output signal of the photographing-position detection switch 434b, the CPU 432 checks whether the lens barrel 403 reaches the photographing position (lens initial position), for example, a zoom wide end position. When it is detected that the lens barrel 403 reaches the photographing position, in step S3, the drive motor 411 is turned off to stop the projection of the lens barrel 403.

After that, the process proceeds to step S4. Whether the release button 410 is operated is checked using the release switch 410a. When the switch 410a is turned on, the process proceeds to step S5. The CPU 432 executes the sequence of the photographing process.

In the check in step S4, when the turn-off of the release switch 410a is detected, the process skips to step S6. Whether the barrier detection switch 401c of the barrier 402 is turned on or off is checked. When the turn-on of the barrier detection switch 401c is detected, namely, when the barrier 402 is moved in the closing direction by the manual operation, the process proceeds to step S7. Thus, the lens barrel 403 is driven in the retracting direction.

In step S8, on the basis of the output signal of the stored-mode detection switch 434a, the CPU 432 checks whether the lens barrel 403 is retracted in the stored position. When it is determined that the lens barrel 403 reaches the stored position, the process proceeds to step S9. Driving the lens barrel 403 is stopped and the present processing routine is finished.

The photo-interrupter 417 in the circuit of FIG. 35 is used for a precise positioning control and the like at the photographing position and the collapsed position of the lens barrel. Since the arrangement is not inevitably required, the detailed description thereof is omitted.

In the above-mentioned barrier-attached camera according to the seventh embodiment, the mechanism for locking the barrier 402 is remarkably simple and the number of components is small. While the lens barrel 403 is being retracted to the collapsed position, even if the barrier 402 is pressed in the closing direction, the locking shaft 418 is fitted into the engagement hole 402c of the barrier 402 to lock the barrier at the barrier semi-open position P2C. Thus, the interference with the lens barrel 403 is surely prevented.

During the retracting operation of the lens barrel, if the pressing force is not applied to the barrier 402, the return spring 419 returns the locking shaft 418 as it is to an unlocking position, namely, a position where the locking shaft 418 is not projected from the supporting hole 401i of the camera body 401. However, when the locking shaft 418 is held to be pressed in the direction SA by the barrier 402, the locking shaft 418 is not retracted and the pressure spring 403g is retracted together with the lens barrel 403. Therefore, the driving system of the lens barrel 403 is driven in the normal retracting state without overload.

As mentioned above, according to the seventh embodiment, in the camera having the barrier which is movable between the open position where the photographic lens is exposed and the closed position where the photographic lens is covered, even if the barrier is pressed in the closing direction during the retracting operation of the lens barrel to the stored position, the barrier is locked. Accordingly, the barrier never comes into contact with the lens barrel and overload is not applied to the lens-barrel driving means. The structure of the mechanism for locking the barrier is remarkably simple thus resulting in a reduction in the cost.

What is claimed is:

1. A method for manufacturing a camera exterior part comprising an exterior member made of a metal and an inner frame member made of a resin, the inner frame member being integrally attached to the inner surface of the exterior member, the method comprising the steps of:

forming the inner frame member using a resin by injection molding so as to have in one piece a reinforcing portion for preventing deformation;

applying an adhesive to the inner surface of the metallic exterior member to fix the inner frame member having the reinforcing portion in one piece to the inner surface of the exterior member; and cutting and removing the reinforcing portion of the inner frame member after the completion of the fixing with the adhesive.

2. The method according to claim 1, wherein the reinforcing portion also functions as a runner for supplying the resin in the step of injection molding.

3. The method according to claim 1, wherein the reinforcing portion of the inner frame member is formed as a substantially rectangular frame having in one piece a substantially cross-shaped reinforcing rib.

4. The method according to claim 2, wherein the reinforcing portion of the inner frame member is formed as a substantially rectangular frame having a substantially cross-shaped reinforcing rib in one piece.

5. The method according to claim 1, wherein the reinforcing portion is cut and removed in a step of fixing the exterior part to a camera body.

6. The method according to claim 2, wherein the reinforcing portion is cut and removed in a step of fixing the exterior part to a camera body.

7. The method according to claim 3, wherein the reinforcing rib is cut and removed in a step of fixing the exterior part to a camera body.

8. A camera exterior part comprising an inner frame member which is formed so as to have a reinforcing portion for preventing deformation in one piece and which is formed using a resin by injection molding; and fixing means for applying an adhesive to the inner surface of the exterior member made of a metal, pushing the inner frame member having the reinforcing portion in one piece against the inner surface of the exterior member to integrally fix the inner frame member to the exterior member, wherein after the completion of the fixing by the fixing means, the reinforcing portion of the inner frame member is cut.

9. The camera exterior part according to claim 8, wherein the reinforcing portion includes a rib.

10. The camera exterior part according to claim 8, wherein the reinforcing portion also functions as a runner for supplying the resin in a step of injection molding.

11. The camera exterior part according to claim 9, wherein the reinforcing portion also functions as a runner for supplying the resin in a step of injection molding.

12. The camera exterior part according to claim 8, wherein the reinforcing portion is formed such that the thickness is substantially uniformed.

13. The camera exterior part according to claim 8, wherein a separation pattern to realize cutting in a predetermined position is formed in the inner frame member including the reinforcing portion.

14. The camera exterior part according to claim 12, wherein a separation pattern to realize cutting in a predetermined position is formed in the inner frame member including the reinforcing portion.

15. A camera exterior part comprising:

an exterior member made of a metal; and an inner frame member which is attached to the inner surface of the exterior member by adhesion, which has in one piece a reinforcing portion for preventing deformation, and which is formed using a resin by injection molding, the reinforcing portion being removed after the completion of the attachment.

* * * * *

UNITED STATES PATENT AND TRADEMARK OFFICE
CERTIFICATE OF CORRECTION

PATENT NO.    : 6,826,367 B2
DATED         : November 30, 2004
INVENTOR(S)   : Ichikawa et al.

It is certified that error appears in the above-identified patent and that said Letters Patent is hereby corrected as shown below:

Column 1,
Line 13, delete "1. Field of the Invention".
Line 27, delete "2. Related Art Statement".
Line 44, delete "Recent" and insert -- Recently --.
Line 47, after "and", insert -- makes --.

Column 2,
Line 4, after "piece", delete "is come" and insert -- comes --.
Line 7, after "in", insert -- an --.
Line 27, after "slid", insert -- open --.
Lines 34, 36 and 38, after "guide", delete "nails 1a" and insert -- rails 1a --.
Line 36, delete "both".
Line 37, after "on", delete "both".
Line 39, after "of", delete "guide rails" and insert -- guides --.
Line 42-43, after "the", delete "guide rails" and insert -- guides --.
Line 44, delete "Recent" and insert -- Recently --.
Line 47, after "when a", delete "battier" and insert -- barrier --.

Column 3,
Line 12, after "realizes", delete "high-accurate" and insert -- highly-accurate --.
Line 20, after "without", insert -- the need for --.
Line 53, after "including", insert -- : --.

Column 4,
Line 7, after "to", delete "slide" and insert -- facilitate sliding of --.
Line 35, after "including", insert -- : --.
Line 40, after "is", delete "come" and insert -- brought --.

Column 5,
Line 18, after "line", delete "I-I" and insert -- 6-6 --.
Line 19, after "line", delete "II-II" and insert -- 7-7 --.
Line 31, after "FIG. 10;", begin new paragraph.
Line 32, delete "III-III" and insert -- 11B-11B --.
Line 44, after "line", delete "IV-IV" and insert -- 16-16 --.
Line 50, after "line", delete "V-V" and insert -- 19-19 --.
Line 51, after "line", delete "VI-VI" and insert -- 20-20 --.

Column 6,
Line 15, after "line", delete "VII-VII" and insert -- 30-30 --.
Line 18, after "line", delete "VII-VII" and insert -- (31)-(31) --.
Line 22, after "line", delete "VII-VII" and insert -- (32)-(32) --.

UNITED STATES PATENT AND TRADEMARK OFFICE
CERTIFICATE OF CORRECTION

PATENT NO. : 6,826,367 B2
DATED : November 30, 2004
INVENTOR(S) : Ichikawa et al.

It is certified that error appears in the above-identified patent and that said Letters Patent is hereby corrected as shown below:

Column 6 (cont'd),
Line 26, after "line", delete "VII-VII" and insert -- (33)-(33) --.
Line 28-29, after "being", delete "retracting;" and insert -- retracted; --.
Line 31, after "line", delete "VII-VII" and insert -- (34)-(34) --.
Line 49, delete "EMBODIMENT" and insert -- EMBODIMENTS --.
Line 65, after "guide", delete "holes" and insert -- cut-outs --.

Column 7,
Line 15, after "114", insert -- (see FIG. 6) --.
Line 17, after "guide", delete "holes" and insert -- cut-outs --.
Line 37, after "screws", insert -- (not shown) which are screwed into hollow posts --.
Line 49, after "in a", insert -- unified --.
Line 50, after "114, the", insert -- posts 117 for receiving --.
Line 51, after "screws", delete "117".
Line 58, after "is", delete "come" and insert -- brought --.

Column 8,
Line 11, delete "protrude" and insert -- protrudes --.
Line 15, after "11", insert -- , leaving the front mold and camera body --.
Line 20, after "both", delete "the".
Line 22, after "guide", delete "holes" and insert -- cut-outs --.

Column 9,
Line 6, after "thing", insert -- obtained --.
Line 14, after "131", delete "in one piece" and insert -- formed as one piece with the front mold 13 --.
Line 29, after "technique", insert -- whereby these members --.
Line 38, after "is", delete "come" and insert -- brought --.

Column 10,
Line 10, after "press", delete "work working" and insert -- work. Working --.

Column 11,
Line 7, delete "doubly folded up", and insert -- folded along a side adjacent to the lens barrel 208 --.
Line 9, after "signals", delete "to from" and insert -- to/from --.
Line 10, after "in the", delete "doubly folded-up" and insert -- folded --.
Line 18, after "line", delete "III-III" and insert -- 11B-11B --.
Line 19, after "the" (first occurrence), delete "state" and insert -- details --.
Line 45, after "a", delete "conical".

UNITED STATES PATENT AND TRADEMARK OFFICE
CERTIFICATE OF CORRECTION

PATENT NO. : 6,826,367 B2
DATED : November 30, 2004
INVENTOR(S) : Ichikawa et al.

It is certified that error appears in the above-identified patent and that said Letters Patent is hereby corrected as shown below:

Column 11 (cont'd),
Line 51, after "212.", begin a new paragraph.
Line 51, after "inserted", delete "to" and insert -- into --.
Line 60, delete "212arestricts" and insert -- 212a restricts --.
Line 66, after "in", insert -- a --.
Line 67, after "202,", insert -- a portion of --.

Column 12,
Line 3, after "is", insert -- thus --.
Line 6, after "in", insert -- solid-line fashion in --.
Line 6, after "upper", insert -- (i.e. narrow end) --.
Line 8, after "202", delete "with" and insert -- due to --.
Line 12, after "is", delete "decreased to" and insert -- maintained at --.
Line 31, after "the", insert -- common --.
Line 36, after "pattern", delete "112b" and insert -- 212b --.
Line 42, after "inserted", delete "to" and insert -- into --.
Line 52, after "where the", delete "whole of the" and insert -- entire --.
Line 67, after "for", delete "the".

Column 13,
Line 7, delete "such a shape" and insert -- a shape such --.
Line 13, after "is", insert -- so --.
Line 19, after "fitted", delete "to" and insert -- about --.
Lines 24-25, after "Thus,", delete "the similar advantages as those of" and insert -- advantages similar to --.
Line 56, after "Further, a", delete "through hole" and insert -- slot --.
Line 62, delete "On the other hand," and insert -- Alternatively, --.
Line 64, after "formed", delete "in substantially" and insert -- substantially in --.

Column 14,
Line 1, after "in the", delete "through hole" and insert -- slot --.
Line 4, after "FIG", delete "14-2)" and insert -- 14) --.
Line 34, after "formed", insert -- so as to be --.
Line 34, after "333", insert -- and --.
Line 37, after "addition,", delete "round" and insert -- curved --.
Line 37, after "325", insert -- (see Fig. 15) --.
Line 40, after "The", delete "round" and insert -- curved --.
Line 40, after "movably", delete "come" and insert -- brought --.
Line 61, delete "through hole" and insert -- slot --.

UNITED STATES PATENT AND TRADEMARK OFFICE
CERTIFICATE OF CORRECTION

PATENT NO. : 6,826,367 B2
DATED : November 30, 2004
INVENTOR(S) : Ichikawa et al.

It is certified that error appears in the above-identified patent and that said Letters Patent is hereby corrected as shown below:

Column 15,
Lines 2 and 5, after "are", delete "come" and insert -- brought --.
Line 11, after "or", delete "SE" and insert -- SB --.
Line 13, after "SA, the", delete "round" and insert -- curved --.
Line 27, after first use of "the", delete "round" and insert -- curved --.
Line 47, after "projecting", delete "higher" and insert -- outward further --.
Line 49, after "moved", delete "on" and insert -- along --.
Line 53, after "slid", insert -- along rails 311 --.

Column 16,
Line 4, after "both", delete "the".
Line 13, after "311.", begin a new paragraph.
Line 30, after "formed", delete "in an almost hemisphere" and insert -- to be substantially hemisphere-shaped --.

Column 17,
Line 25, after "body", delete "01" and insert -- 401 --.
Line 35, after "402", delete "under the control." and insert -- operating under control of the lens barrel. --.
Line 62, after "axis", delete "0" and insert -- O --.
Line 67, after "of the", insert -- camera above --.

Column 18,
Line 21, delete "02a and 02b" and insert -- 402a and 402b --.
Line 53, after "402c", insert -- is not a through-hole and --.
Line 57, after "moved", delete "form" and insert -- from --.

Column 19,
Line 12, after "axis", delete "0" and insert -- O --.
Line 14, after "parallel", delete "to" and insert -- with --.
Line 25, after "414", delete "to be".
Line 37, after "later", delete "(FIG. 35/13)" and insert -- (see FIG. 35) --.
Line 45, after "axis", delete "0" and insert -- O --.
Line 49, after "fitted", delete "in" and insert -- into --.
Line 54, after "419", insert -- surrounds shaft 418 and --.
Line 56, after "with", insert -- , i.e. is separated from, --.
Line 65, after "shaft", delete "416" and insert -- 418 --.

Column 20,
Line 2, after "axis", delete "0" and insert -- O --.
Line 4, after "be", delete "come" and insert -- brought --.

UNITED STATES PATENT AND TRADEMARK OFFICE
CERTIFICATE OF CORRECTION

PATENT NO. : 6,826,367 B2
DATED : November 30, 2004
INVENTOR(S) : Ichikawa et al.

It is certified that error appears in the above-identified patent and that said Letters Patent is hereby corrected as shown below:

Column 20 (cont'd),
Line 10, after "434b", insert -- shown in FIG. 35 --.
Line 12, after "420a", insert -- selectively --.
Line 13, after "the", delete "pattern" and insert -- patterns --.
Line 21, after "switch", delete "434bof" and insert -- 434b of --.
Line 31, after "the", delete "line VII-VII" and insert -- section lines 30-30 through (34)-(34) --.
Line 46, after "418", delete "backward" and insert -- in a backward direction --.
Line 47, after "member", delete "402" and insert -- 422 --.
Line 54, delete "403gpresses" and insert -- 403g presses --.
Line 66, after "barrel", delete "03" and insert -- 403 --.

Column 21,
Line 4, after "P2C,", delete "80" and insert -- so --.
Line 6, after "402f", insert -- (see FIG. 25) --.
Line 55, after "above,", delete "60" and insert -- so --.

Column 22,
Line 55, after "barrier", delete "2" and insert -- P2A --.
Line 55, after "by", delete "the" and insert -- a --.

Column 23,
Line 20, after "stored", insert -- (i.e. collapsed) --.
Line 36, delete first occurrence of "the".
Line 36, after "is", delete "surely" and insert -- positively --.

Signed and Sealed this

Twenty-first Day of February, 2006

JON W. DUDAS
*Director of the United States Patent and Trademark Office*